(12) United States Patent
Couch et al.

(10) Patent No.: US 12,515,579 B2
(45) Date of Patent: ***Jan. 6, 2026

(54) LOAD SECURING DEVICE

(71) Applicant: Steven D. Couch, Aladdin, WY (US)

(72) Inventors: Steven D. Couch, Aladdin, WY (US); Kyle J. Roe, Rapid City, SD (US)

(*) Notice: Subject to any disclaimer, the term of this patent is extended or adjusted under 35 U.S.C. 154(b) by 603 days.

This patent is subject to a terminal disclaimer.

(21) Appl. No.: 17/955,985

(22) Filed: Sep. 29, 2022

(65) Prior Publication Data
US 2023/0322150 A1 Oct. 12, 2023

Related U.S. Application Data

(63) Continuation of application No. 17/718,752, filed on Apr. 12, 2022, now Pat. No. 11,458,882.

(51) Int. Cl.
*B60P 7/08* (2006.01)
*B60P 7/135* (2006.01)

(52) U.S. Cl.
CPC .................................. *B60P 7/135* (2013.01)

(58) Field of Classification Search
CPC B60P 7/135; B60P 7/0892; B60P 7/10; B60P 7/13; B60P 7/14
USPC .. 410/94, 121–124, 127–129, 143, 151, 155
See application file for complete search history.

(56) References Cited

U.S. PATENT DOCUMENTS

| | | |
|---|---|---|
| 923,463 A | 6/1909 | Taylor |
| 3,049,328 A | 8/1962 | Bishop |
| 3,754,516 A | 8/1973 | Van Gompel |
| 4,669,934 A | 6/1987 | Wisecarver |
| 4,781,499 A | 11/1988 | Wisecarver |
| 5,011,350 A | 4/1991 | Brock |
| 5,028,185 A | 7/1991 | Shannon |
| 5,109,985 A | 5/1992 | Rose |
| 5,378,095 A | 1/1995 | Shultz |
| 5,443,342 A | 8/1995 | Huang |
| 5,472,301 A | 12/1995 | Wallen |
| 5,769,580 A | 6/1998 | Purvis |
| 5,833,414 A | 11/1998 | Feldman |
| 5,890,856 A | 4/1999 | Huang |
| 5,934,850 A | 8/1999 | Soumar |
| 5,947,666 A | 9/1999 | Huang |

(Continued)

OTHER PUBLICATIONS https://www.globalindustrial.com/p/material-handling/dock-truck/cargo-restraint-bars/folding-steel-cargo-bar-load-stabilizer; Global Industrial Folding Steel Cargo Control Bar & Load Stabilizer Webpage; Received Aug. 13, 2019.

(Continued)

*Primary Examiner* — Stephen T Gordon
(74) *Attorney, Agent, or Firm* — Neustel Law Offices

(57) ABSTRACT

A load securing device for securing a load in a container. In an example embodiment, the load securing device includes a first support, a second support telescopic connected to the first support and a locking mechanism connected between the first support and the second support. In an adjustment mode, the locking mechanism moves the first support away from the second support until the first support touches a wall of the container and the second support touches the load. In a locked mode, the locking mechanism applies the force against the wall and against the load to secure the load. Another example implementation includes a second adjustment mechanism.

18 Claims, 18 Drawing Sheets

(56) References Cited

U.S. PATENT DOCUMENTS

| | | | |
|---|---|---|---|
| 6,042,312 | A | 3/2000 | Durham, II |
| 6,210,090 | B1 | 4/2001 | Wyse |
| 6,238,154 | B1 | 5/2001 | DaPrato |
| 6,247,882 | B1 | 6/2001 | Huang |
| 6,368,037 | B1 | 4/2002 | Oliviero |
| 6,598,756 | B1 | 7/2003 | Rosenfeldt |
| 6,733,220 | B2 | 5/2004 | Brown |
| 6,742,975 | B2 | 6/2004 | Trine |
| 6,755,600 | B2 | 6/2004 | Scott |
| 6,840,725 | B2 * | 1/2005 | Moore ............. B60P 7/15 410/151 |
| 7,334,973 | B2 | 2/2008 | Scott |
| 7,735,429 | B2 | 6/2010 | Meissen |
| 8,162,576 | B1 | 4/2012 | Chou |
| 8,202,029 | B2 | 6/2012 | Chou |
| 8,608,416 | B2 | 12/2013 | Xiao |
| 9,487,293 | B2 | 11/2016 | Noe |
| 10,040,601 | B2 | 8/2018 | Noe |
| 11,007,922 | B1 | 5/2021 | Couch |
| 11,458,882 | B1 * | 10/2022 | Couch ............. B60P 7/0892 |
| 2003/0152437 | A1 | 8/2003 | Moore |
| 2009/0057272 | A1 | 3/2009 | Modgil |
| 2009/0202315 | A1 | 8/2009 | Keramidis |
| 2016/0243976 | A1 | 8/2016 | Cote |
| 2022/0089081 | A1 * | 3/2022 | Couch ............. B60P 7/135 |

OTHER PUBLICATIONS https://www.homedepot.com/p/CargoLoc-Light-Duty-Ratcheting-Cargo-Bar-82342/309994567; CargoLoc Light-Duty Ratcheting Cargo Bar from Home Depot Webpage; Received Aug. 13, 2019.

https://www.rv4x4.net.au/ratcheting-cargo-bar-40-70; RV 4x4 Ratcheting Cargo Bar Webpage; Received Aug. 13, 2019.

https://www.uline.com/product/detail/h-1413/dock-equipment/steel-load-bar-87-119; Uline Steel Ratchet Load Bar Webpage; Received Aug. 13, 2019.

http://polyurethane.americanchemistry.com/resources-and-document-library/guidelines-for-freight-securement.pdf; American Chemistry Council Guidelines for Freight Securement, Issue AX173; Telescoping Load Bars—p. 19; Aug. 2012.

https://www.uscargocontrol.com/Round-Tube-Steel-Cargo-Bar-w-2-25-x-3-Pads-Adj-39-71; US Cargo Control Ratcheting Cargo Bar Webpage; Received Aug. 13, 2019.

* cited by examiner

LOAD SECURING DEVICE

CROSS REFERENCE TO RELATED APPLICATIONS

The present application is a continuation of U.S. application Ser. No. 17/718,752 filed on Apr. 12, 2022 which issues as U.S. Pat. No. 11,458,882 on Oct. 4, 2022. Each of the aforementioned patent applications is herein incorporated by reference in their entirety.

STATEMENT REGARDING FEDERALLY SPONSORED RESEARCH OR DEVELOPMENT

Not applicable to this application.

BACKGROUND

The described example embodiments in general relate to a load securing device for securing a load, such as cargo on a pallet, inside a container, such as a cargo trailer, to prevent the load from moving inside the container.

A common approach to securing a load inside a transport container is to nail wooden boards to the floor of the container to secure the load. However, driving nails into the floor ruins the floor. Other braces may be used to secure a load; however, such braces require positioning the brace near the center of mass of the load thereby blocking passage along the insides the container. Shippers would benefit from a load securing device that rests on the floor while securing the load and that is adjustable in length to span from the load to the wall of the container.

SUMMARY

Some of the various embodiments of the present disclosure relate to a load securing device that can secure a load inside a container, such as a trailer. Some various embodiments of the present disclosure include a first support, a second support, a first inner member, a second inner member, a first rack and a locking mechanism. Other various embodiments of the present disclosure include a first support, a second support, a first inner member, a second inner member, a first rack, a second rack and a locking mechanism. Other various embodiments of the present disclosure further include a second adjustment mechanism.

In some embodiments, the locking mechanism is used to extend the load securing device between a wall of the container and the cargo to secure the cargo. In other embodiments, the second adjustment member and the locking mechanism are used to extend the load securing device between the wall and the cargo to secure the cargo. The locking mechanism may move between an adjustment position and a locked position. While in the adjustment position, the locking mechanism may be operated to push against the first rack and/or the second rack to extend the load securing device by moving the first support away from the second support. The locking mechanism may be operated until the first support comes into contact with the wall and the second support comes into contact with the cargo, or vice versa. After the load securing device has been extended to reach from the wall to the cargo, the locking mechanism may be moved into the locked position to fix the distance between the first support and the second support. Moving the locking mechanism into the locked position causes the load securing device to apply a force against the wall and against the cargo to secure the cargo. The load securing device maintains the force between the wall and the cargo to hold the cargo in place during transport.

In some embodiments, after the cargo has been transported, the load securing device may be removed from between the wall and the cargo by moving the locking mechanism from the locked position to the adjustment position to eliminate the force between the wall and the cargo. The securing device may then be shortened, if necessary, and moved away from the cargo, so the cargo may be unloaded.

There has thus been outlined, rather broadly, some of the embodiments of the present disclosure in order that the detailed description thereof may be better understood, and in order that the present contribution to the art may be better appreciated. There are additional embodiments that will be described hereinafter and that will form the subject matter of the claims appended hereto. In this respect, before explaining at least one embodiment in detail, it is to be understood that the various embodiments are not limited in its application to the details of construction or to the arrangements of the components set forth in the following description or illustrated in the drawings. Also, it is to be understood that the phraseology and terminology employed herein are for the purpose of the description and should not be regarded as limiting.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evidence to the contrary from the description, where elements in different FIGS. use identical reference numbers, the elements are generally either identical or at least similar in function or purpose.

DETAILED DESCRIPTION

A. Overview

Figure 1:
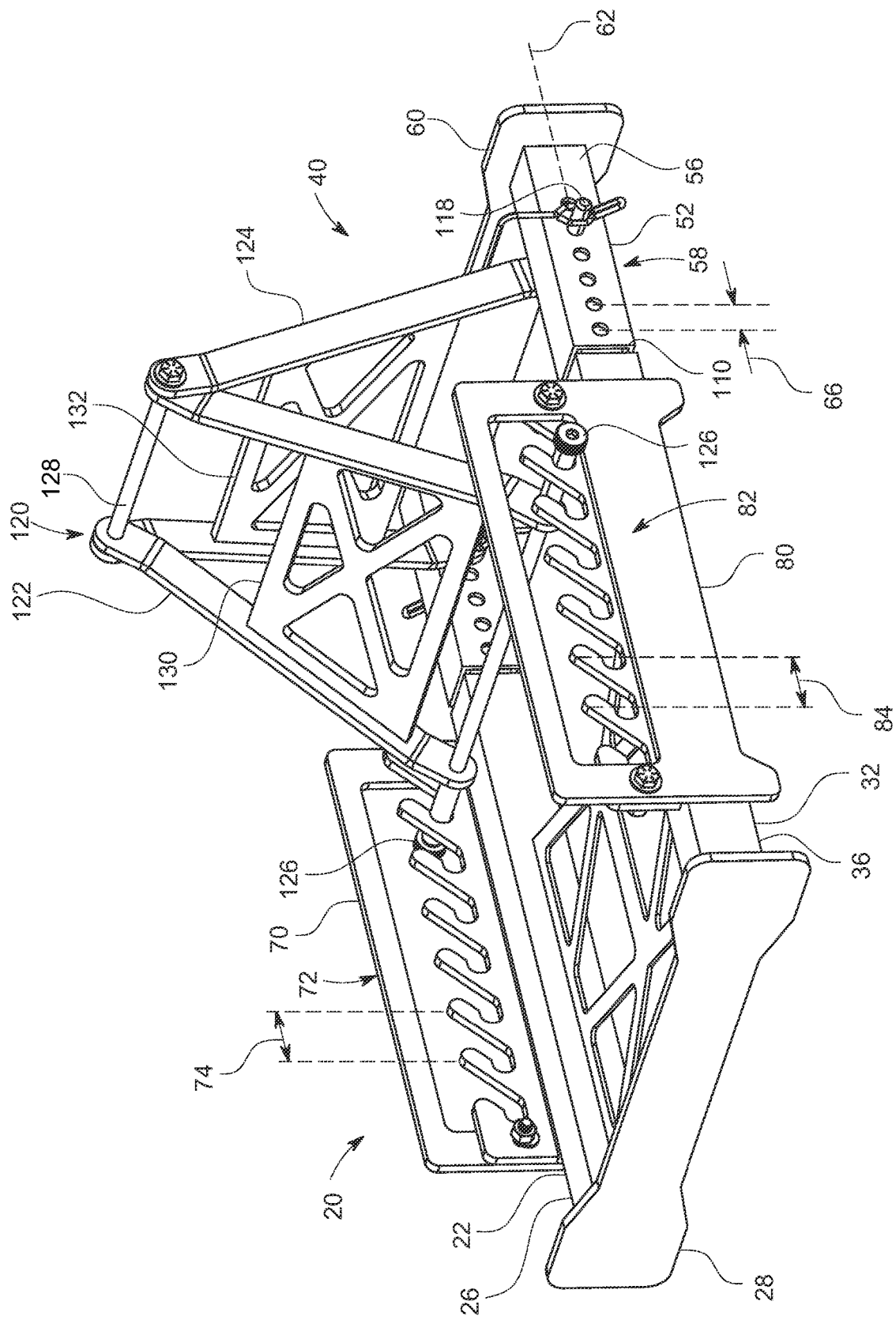
FIG. 1 is a perspective view of a load securing device with the locking mechanism in the adjustment position in accordance with an example embodiment.

Some of the various embodiments of the present disclosure relate to a load securing device that can be used to secure a cargo 16 inside a container 10 (e.g., semi-truck trailer, railroad car, shipping container). The cargo 16 may be fastened to a pallet, so the load securing device may secure the pallet to secure the load. One load securing device may secure cargo by pressing the cargo 16 against one wall (e.g., 12, 14) of the container so that the cargo cannot move. Two load securing devices, as best shown in FIGS. 9A-9B and 10A-10B, may be used to secure the cargo 16 between two opposing walls of the container. The cargo 16 may be placed in between the two opposing walls 12 and 14. A left load securing device is placed between a wall 12 and the cargo 16. A right load securing device is placed between a wall 14 and the cargo 16. The right load securing device pushes against the wall 12 and against the cargo 16 in a first direction (e.g., toward the right). The left load securing device pushes against the wall 14 and against the cargo 16 in a second direction (e.g., toward the left) opposite the first direction. The opposing pushing forces secure the cargo 16 between the wall 12 and the wall 14 so the cargo 16 does not move during transport.

Some of the various embodiments of the present disclosure include a first support 20, a second support 40, a first inner member 100, a second inner member 110, a first rack 70 and a locking mechanism 120. Other various embodiments of the present disclosure include the first support 20, the second support 40, the first inner member 100, the second inner member 110, the first rack 70, a second rack 80 and a locking mechanism 120. The various embodiments a further include a second adjustment mechanism.

The first support 20 and the second support 40 move toward or away from each other along the first inner member 100 and the second inner member 110. The first rack 70 and the second rack 80 are connected to the first support. The locking mechanism 120 is connected between the second support 40 and the first rack 70 and second rack 80. The locking mechanism 120 is movable between an adjustment position and a locked position. The load securing device may be placed between the wall (e.g., 12, 14) and the cargo 16. While the locking mechanism 120 is in an adjustment position, the locking mechanism 120 may be operated to press against the first rack 70 and/or the second rack 80 to move the first support 20 away from the second support 40 until the first support 20 touches the wall 12 and the second support 40 touches the cargo 16 (e.g., or vice a versa). The locking mechanism 120 may then be moved into the locked position. While the locking mechanism 120 is in the locked position, the locking mechanism 120 presses against the first rack 70 and the second rack 80 to force the first support 20 against the wall 12 and the second support 40 against the cargo 16 to secure the cargo 16. While the locking mechanism 120 is in the locked position, it maintains the force on the first rack 70 and/or the second rack 80 to maintain the force between the wall 12 and the cargo 16 to secure the cargo 16.

In some other example embodiments, the load securing device further includes a second adjustment mechanism in addition to the locking mechanism 120 which in combination with the first rack 70 and/or the second rack 80 may be referred to as a first adjustment mechanism. With respect to the second adjustment mechanism, the second support 40 includes a first plurality of holes 48 and a second plurality of holes 58 that cooperate with a second portion 104 of the first inner member 100 and a fourth portion 114 the second inner member 110 to adjustably lengthen or shorten the load securing device. If the gap between the wall 12 and the cargo 16 is large, the first plurality of holes 48 and second plurality of holes 58 may be used to increase the distance between the first support 20 and the second support 40 to span the gap. If the gap between the wall and the cargo is small, the first plurality of holes 48 and second plurality of holes 58 may be used to decrease the distance between the first support 20 and the second support 40 so the load securing device can fit between the wall 12 on the cargo 16. As discussed above, the first adjustment mechanism, may also be used to increase the distance between the first support 20 and the second support 40 to span the gap between the wall 12 and the cargo 16 and to apply a force against the cargo 16.

B. First Support and Second Support

As discussed above and best shown in FIGS. 1 and 2, FIGS. 3-5 and FIGS. 6 and 7, the first support 20 moves along the first inner member 100 and the second inner member 110 to increase (e.g., extend the load securing device) or decrease (e.g., retract the load securing device) the distance between the first support 20 and the second support 40. The distance between the first support 20 and the second support 40 may be increased or decreased so the load securing device spans the gap between the wall 12 or 14 and the cargo 16. To secure the load, one support (e.g., first support 20, second support 40) touches the wall (e.g., 12, 14) and the other support (e.g., second support 40, first support 20) touches the cargo 16. The locking mechanism 120 may be moved to the adjustment mode and operated to move the first support 20 away from the second support 40 to span the gap. Once the first support 20 and the second support 40 touched the wall and the cargo 16, the locking mechanism 120 may be moved into the locking position to apply a force between the first support 20 and the second support 40 that in turn exerts a force between the wall and the cargo 16 to secure the cargo 16.

In an example embodiment, the first support 20 has a first outer member 22, a second outer member 32 and a first brace 28. The first brace 28 is connected between the first outer member 22 and the second outer member 32. In an example embodiment, best shown in FIGS. 1-8 and 11-14, the first brace 28 is connected to the first outer member 22 at or near a first end 26 of the first outer member 22 and to the second outer member 32 at or near a first end 36 of the second outer member 32. The first brace 28 fixes (e.g., establishes, sets) the distance between the first outer member 22 and the second outer member 32. The first brace 28 connects to the first outer member 22 and the second outer member 32 in any manner. In an example embodiment, the first outer member 22, the second outer member 32 and the first brace 28 are formed of metal and the first brace 28 is welded to the first outer member 22 and the second outer member 32. A support, best shown in FIGS. 1-3, 9A-9B and 11, may also connect between the first outer member 22 and the second outer member 32 to strengthen the first outer member 22 and the second outer member 32.

In an example embodiment, best shown in FIGS. 3-5, 9A-9B, 12 and 14, the second support 40 has a third outer member 42, a fourth outer member 52 and a second brace 60. The second brace 60 is connected between the third outer member 42 and the fourth outer member 52. In an example embodiment, the second brace 60 is connected to the third outer member 42 at or near a first end 46 of the third outer member 42 and to the fourth outer member 52 at or near a first end 56 of the fourth outer member 52. The second brace 60 fixes the distance between the third outer member 42 and the fourth outer member 52. The second brace 60 connects to the third outer member 42 and the fourth outer member 52 in any manner. In an example embodiment, the third outer member 42, the fourth outer member 52 and the second brace 60 are formed of metal and the second brace 60 is welded to the third outer member 42 and the fourth outer member 52.

As best shown in FIGS. 9A and 9B or 10A and 10B, because the first brace 28 is connected to the first end 26 and the first end 36 of the first outer member 22 and the second outer member 32 respectively, the first brace 28 contacts either the wall (e.g., 12, 14) or the cargo 16 while securing the load. Because the second brace 60 is connected to the first end 46 and the first end 56 of the third outer member 42 and the fourth outer member 52 respectively, the second brace 60 contacts either the cargo 16 or the wall while securing the load.

In an example embodiment, the first outer member 22 has a channel 24 along a length thereof. The channel 24 is for slidably receiving the first inner member 100. In particular, a first portion 102 of the first inner member 100 is positioned in (e.g., inserted into) the channel 24 to slidably connect the first inner member 100 to the first outer member 22. The first outer member 22 slides along the first portion 102 of the first inner member 100. The second outer member 32 has a channel 34 along the length thereof. The channel 34 is for slidably receiving the second inner member 110. In particular, a third portion 112 of the second inner member 110 is positioned in (e.g., inserted into) the channel 34 to slidably connect the second inner member 110 to the second outer member 32. The second outer member 32 slides along the third portion 112 of the first inner member 100. As the first support 20 moves away from or toward the second support 40, the first support 20 slidably moves back and forth along the first portion 102 and the third portion 112 of the first inner member 100 and the second inner member 110.

Figure 18:
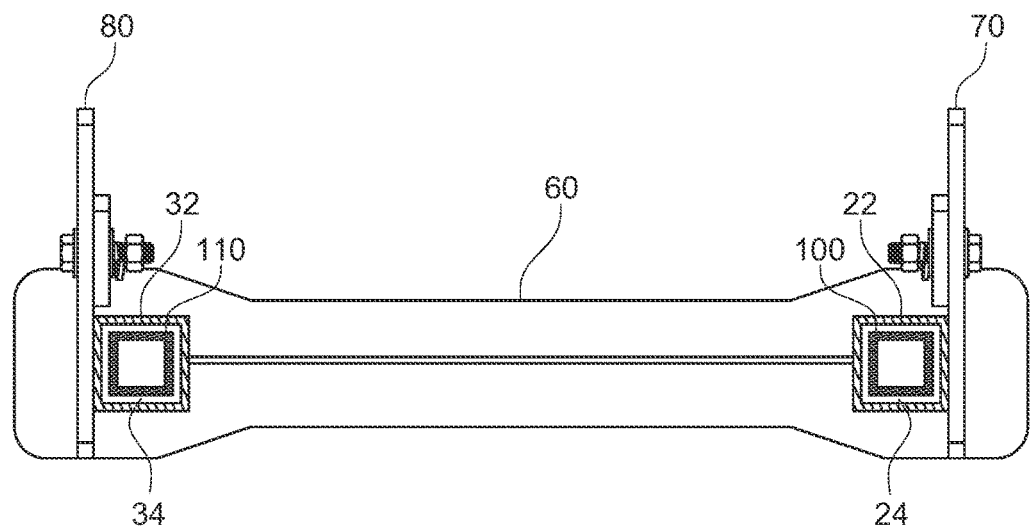
FIG. 18 is a cross-section of the load securing device of FIG. 4 with the locking mechanism removed for clarity.

In another example embodiment, as best shown in FIG. 18, the channel 24 is inside the first outer member 22 along the length of the first outer member 22. The channel 34 is inside the second outer member 32 along the length of the second outer member 32. In this example embodiment, the first outer member 22 and the second outer member 32 maybe hollow tubes (e.g., square, rectangular, round). The first portion 102 of the first inner member 100 is slidably positioned inside the channel 24 and the third portion 112 of the second inner member 110 is slidably positioned inside the channel 34. As the first support 20 moves with respect to the second support 40, the first portion 102 and the third portion 112 slidably move into an out of the channel 24 and the channel 34 respectively. As can be seen in FIGS. 5, 7-8 and 12, the locking mechanism 120 connects between the first support 20 and the second support 40 and prevents the first support 20 from moving so far away from the second support 40 that the first inner member 100 and the second inner member 110 completely exit the channels 24 and 34 respectively. So, the first portion 102 of the first inner member 100 and the third portion 112 of the second inner member 110 remain positioned in the channel 24 and the channel 34 respectively during normal operation of the load securing device.

As discussed above, the first inner member 100 and the second inner member 110 also connect to the third outer member 42 and the fourth outer member 52 respectively. Although the first inner member 100 and the second inner member 110 adjustably connect to the third outer member 42 and the fourth outer member 52 respectively, they do not slidably connect. Even though the position of the first inner member 100 with respect to the third outer member 42 and the position of the second inner member 110 with respect to the fourth outer member 52 may be adjusted (e.g., changed, extended, retracted), while the load securing device secures the load, the first inner member 100 is fixedly connected to the third outer member 42 and the second inner member 110 is fixedly connected to the fourth outer member 52. Prior to securing the load, the position of the first inner member 100 and the second inner member 110 may be adjusted with respect to the third outer member 42 and the fourth outer member 52 respectively.

In an example embodiment, the third outer member 42 has a channel 44 along a length thereof. The channel 44 is for receiving the first inner member 100. In particular, a second portion 104 of the first inner member 100 is positioned in (e.g., inserted into) the channel 44 to adjustably connect the first inner member 100 to the third outer member 42. The fourth outer member 52 has a channel 54 along the length thereof. The channel 54 is for receiving the second inner member 110. In particular, the fourth portion 114 of the second inner member 110 is positioned in (e.g., inserted into) the channel 54 to adjustably connect the second inner member 110 to the fourth outer member 52.

Figure 17:
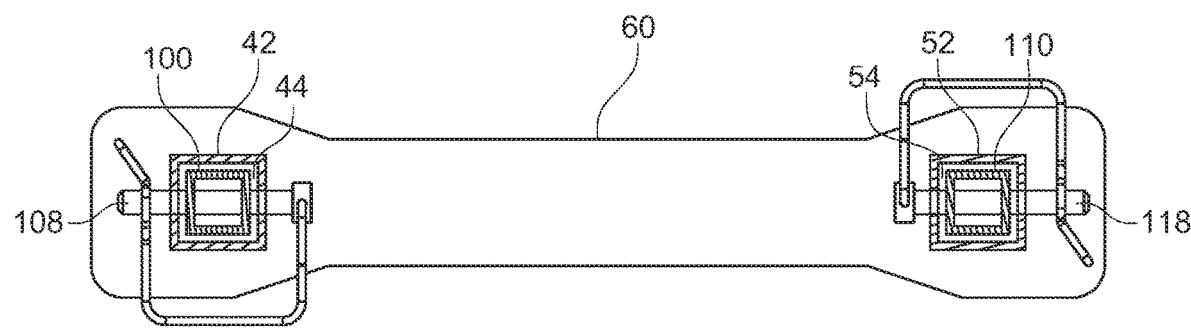
FIG. 17 is a cross-section of the load securing device of FIG. 3 with the locking mechanism removed for clarity.

In another example embodiment, as best seen in FIG. 17, the channel 44 is inside the third outer member 42 along the length of the third outer member 42. The channel 54 is inside the fourth outer member 52 along the length of the fourth outer member 52. In this example embodiment, the third outer member 42 and the fourth outer member 52 maybe hollow tubes (e.g., square, rectangular, round). The second portion 104 of the first inner member 100 is positioned inside (e.g., inserted into) the channel 44 and the fourth portion 114 of the second inner member 110 is positioned inside (e.g., inserted into) the channel 54. The second portion 104 of the first inner member 100 and the fourth portion 114 of the second inner member 110 are adjustably connected to the third outer member 42 and the fourth outer member 52. Even though the connections between first inner member 100 and the second inner member 110 to the third outer member 42 and the fourth outer member 52 respectively are adjustable, once the adjustment is made the first inner member 100 and the second inner member 110 are fixedly connected to the third outer member 42 and the fourth outer member 52 respectively.

Adjustably connecting the first inner member 100 to the third outer member 42 is accomplished using the first plurality of holes 48, the hole 106 and the pin 108. Adjustably connecting the second inner member 110 to the fourth outer member 52 is accomplished using the second plurality of holes 58, the hole 116 and the pin 118. Adjusting is discussed below in greater detail.

C. First and Second Inner Members

As discussed briefly above, the first inner member 100 movably (e.g., slidably) connects to the first outer member 22. The first inner member 100 also adjustably connects to the third outer member 42. The second inner member 110 movably (e.g., slidably) connects to the second outer member 32. The second inner member 110 also adjustably connects to the fourth outer member 52. In other words, the first inner member 100 and the second inner member 110 connect between the first support 20 and the second support 40. Because the first inner member 100 and the second inner member 110 slidably connect to the first outer member 22 and the second outer member 32, the first support 20 is able to move toward or away from the second support 40. As the first support 20 moves relative to the second support 40, the first outer member 22 and the second outer member 32 slide back and forth along the first inner member 100 and the second inner member 110 respectively. In particular, as the first support 20 moves with respect to the second support 40, the first outer member 22 and the second outer member 32 slide back and forth along the first portion 102 of the first inner member 100 and the third portion 112 of the second inner member 110 respectively.

As discussed above, the first outer member 22 may include the channel 24 and the second outer member 32 may include the channel 34. In the example embodiment, the first portion 102 of the first inner member 100 is inserted into the channel 24 and the third portion 112 of the second inner member 110 is inserted into the channel 34. As a result, the first portion 102 of the first inner member 100 is telescopically connected to the first outer member 22 of the first support 20. Further, the third portion 112 of the second inner member 110 is telescopically connected to the second outer member 32 of the first support 20. The connection is described as telescopic because the first outer member 22 and the second outer member 32 slidably move back and forth along the first portion 102 of the first inner member 100 and the third portion 112 of the second inner member 110 as the first support 20 and the second support 40 move toward or away from each other.

In contrast, while the first support 20 and the second support 40 slide along the first inner member 100 and the second inner member 110 respectively to move toward or away from each other, the first inner member 100 and the second inner member 110 do not move relative to the third outer member 42 and the fourth outer member 52 respectively. The first inner member 100 and the second inner member 110 are adjustably connected to the third outer member 42 and the fourth outer member 52 respectively. Prior to using the load securing device to secure the load, the positions of the first inner member 100 and the second inner member 110 relative to the third outer member 42 and the fourth outer member 52 respectively may be adjusted then set (e.g., fixed, fixedly connected). While the load securing device is used to secure the cargo 16, the position of the first inner member 100 and the second inner member 110 are fixed with respect to the third outer member 42 and the fourth outer member 52 respectively. In other words, during use of the load securing device to secure the load, the first inner member 100 and the second inner member 110 are fixedly connected to the third outer member 42 and the fourth outer member 52 respectively.

D. First and Second Racks

The first rack 70 and second rack 80 cooperate with the locking mechanism 120 to push the first support 20 away from the second support 40 and to fix (e.g., hold) the distance between the first support 20 and the second support 40 to secure the cargo 16. As best shown in FIGS. 9A-9B and 10A-10B, the load securing device must reach from the wall (e.g., 12, 14) of the trailer 10 to the cargo 16 in order to secure the cargo 16. The locking mechanism 120 may be operated to push against the first rack 70 and second rack 80 to move the first support 20 away from the second support 40 to span the gap between the wall and the cargo 16.

The locking mechanism 120 may be moved to an adjustment position and operated so it pushes against the first rack 70 and the second rack 80 to push the first support 20 away from the second support 40 to extend across the gap between the wall and the cargo 16. Once the first brace 28 touches the wall and the second brace 60 touch the cargo 16, or vice a versa, the locking mechanism 120 may be moved into the locked position. In the locked position, the locking mechanism 120 pushes against the first rack 70 and the second rack 80 to fix the distance between the first support 20 and the second support 40 and to apply a force between the wall and the cargo 16 to secure the cargo 16. While the locking mechanism 120 is in the locked position, the first support 20 and the second support 40 cannot move closer to each other.

As best seen in FIGS. 1-2, 4, 6-7, and 11-13, the first rack 70 is connected to the first outer member 22. The first rack 70 has a first plurality of teeth 72. The teeth of the first plurality of teeth 72 are spaced apart along a length of the first rack 70. In an embodiment, the spacing 74 of the teeth of the first plurality of teeth 72 is uniform (e.g., even). The second rack 80 is connected to the second outer member 32. The second rack 80 has a second plurality of teeth 82. The teeth of the second plurality of teeth 82 are spaced apart along a length of the second rack 80. In an embodiment, the spacing 84 of the teeth of the second plurality of teeth 82 is uniform (e.g., even).

The teeth of the first plurality of teeth 72 may have any spacing between the teeth whether uniform or irregular. The teeth of the second plurality of teeth 82 many have any spacing between the teeth whether uniform or irregular. In an example embodiment, the teeth of the first plurality of teeth 72 are uniformly spaced with the spacing 74 between each tooth. The teeth of the second plurality of teeth 82 are uniformly spaced with the spacing 84 between each tooth. In an example embodiment, the spacing 74 is a same as the spacing 84. In an example embodiment, the position of each tooth of the first plurality of teeth 72 corresponds to the position of each tooth of the second plurality of teeth 82. In other words, the tooth closest to the first brace 28 of the first plurality of teeth 72 and the tooth closest to the first brace 28 of the second plurality of teeth 82 are the same distance from the first brace 28, and so forth for each tooth. Teeth that are the same distance from the first brace 28 may be referred to as corresponding teeth.

The first rack 70 and the second rack 80 may be connected to the first outer member 22 and the second outer member 32 respectively in any manner. In an example embodiment, the first rack 70 and the second rack 80 are welded to the first outer member 22 and the second outer member 32. In another example embodiment, the first rack 70 and the second rack 80 are connected to the first outer member 22 and the second outer member 32 using a fastener (e.g., Screw that, bolt).

As discussed above, the locking mechanism 120 moves between the adjustment position and the locked position. While in the adjustment position, the locking mechanism 120 operates to move the first support 20 away from the second support 40. The locking mechanism 120 is shown in the adjustment position in FIGS. 1-4, 6, 9A, 10A, and 11. In the adjustment position, the hinge pin 128 of the locking mechanism 120 is positioned above a horizontal line 62. While in the adjustment position, the rachet pin 126 of the locking mechanism 120 may be moved to be positioned against any tooth of the first rack 70 and the second rack 80. Once rachet pin 126 is placed against the tooth of the first rack 70 and the second rack 80, the hinge pin 128 may be pressed downward toward the horizontal line 62. As the hinge pin 128 is pressed down, the locking mechanism 120 pushes the rachet pin 126 against the teeth. Because the first outer member 22 and the second outer member 32 are slidably connected to the first inner member 100 and the second inner member 110 respectively, the pushing force on the teeth moves the first support 20 away from the second support 40. The locking mechanism 120 may be operated to push against the first rack and/or the second rack until the load securing device spans the distance between the wall (e.g., 12, 14) and the cargo 16. As mentioned above, the locking mechanism 120, the first rack 70 and the second rack 80 may be referred to as the first adjustment mechanism for adjusting the distance between the first support 20 and the second support 40.

After the locking mechanism 120 has extended the load securing device so that the first brace 28 and the second brace 60 press against the wall and the cargo 16, the locking mechanism 120 may be moved to the locked position by pressing the hinge pin 128 downward until it is level with or slightly below the horizontal line 62. While in the locked position, the locking mechanism 120 applies a pushing force against the first rack 70 and the second rack 80 to fix the distance between the first support 20 and the second support 40 and thereby the distance between the first brace 28 and the second brace 60. Fixing the distance between the first brace 28 the second brace 60 secures the cargo 16. In the locked position, the locking mechanism 120 maintains the pushing force against the teeth of the first rack 70 and the second rack 80. The locking mechanism 120, the first support 20 and the second support 40 translate the pushing force on the teeth to a pushing force between the wall and the cargo 16 to secure the cargo 16. When the locking mechanism 120 is moved out of the locked position, by lifting the hinge pin 128 above the horizontal line 62, the force against the teeth is released and the pushing force between the wall and the cargo 16 stops thereby releasing the cargo 16.

E. Adjustability

As discussed above, the locking mechanism 120 may be used to increase the distance between the first support 20 and the second support 40 and thereby the distance between the first brace 28 and the second brace 60. However, the locking mechanism 120 and the teeth of the first rack 70 and the second rack 80 are not the only way to adjust the distance between the first support 20 and the second support 40. In another example embodiment, the load securing device of the present disclosure includes a second adjustment mechanism for adjusting the distance between the first support 20 and the second support 40 to span the gap between the wall and the cargo 16.

The second support 40 includes the second adjustment mechanism for adjusting the distance between the first support 20 and the second support 40. As mentioned above, the second adjustment mechanism includes the first plurality of holes 48, the second plurality of holes 58, the pin 108 and the pin 118. The second adjustment mechanism may be described as further including the first inner member 100 and the second inner member 110. Preferably prior to operating the locking mechanism 120 to secure the cargo 16, the second adjustment mechanism may be used to adjust the position of the second support 40 relative to the first support 20. In particular, prior to securing the cargo 16, the position of the first inner member 100 and the second inner member 110 may be adjusted with respect to the third outer member 42 in the fourth outer member 52 to increase or decrease the distance between the first support 20 and the second support 40 and thereby the distance between the first brace 28 and the second brace 60.

In order for the load securing device to secure the cargo 16, as best shown in FIGS. 9A-9B and 10A-10B, it must be able to span the gap (e.g., distance) between a wall (e.g., 12, 14) of the trailer 10 and the cargo 16. Securing the cargo 16 requires the first support 20 (e.g., first brace 28) to come to contact with the wall and the second support (e.g., second brace 60) to come into contact with the cargo 16, or vice a versa. Both the locking mechanism 120 and the second adjustment mechanism may be used to extend the load securing device from the wall to the cargo 16. For example, the distance between the first support 20 and the second support 40 is first adjusted using the second adjustment mechanism then the locking mechanism 120 is operated to finish extending the load securing device between the wall and the cargo 16. If the load securing device does not span the gap after maximum extension using both the second adjusting mechanism and the locking mechanism 120, then the load securing device cannot be used to secure the cargo 16. Preferably, the second adjustment mechanism is used first to adjust the distance between the first support 20 and the second support 40 then the locking mechanism 120 is used to push the first support 20 and the second support 40 against the wall and the cargo 16 followed by moving the locking mechanism 120 to the locked position to apply a pushing force between the wall and the cargo 16 to secure the load.

In an example embodiment, the second adjustment mechanism operates to adjust the position of the first inner member 100 and the position of the second inner member 110 relative (e.g., with respect) to the third outer member 42 and the fourth outer member 52. Adjustment is accomplished by positioning the first inner member 100 with respect to the third outer member 42 and the second inner member 110 with respect to the fourth outer member 52 then connecting the first inner member 100 to the third outer member 42 and the second inner member 110 to the fourth outer member 52. In particular, adjustment is accomplished by positioning the second portion 104 of the first inner member 100 relative to the third outer member 42 and the fourth portion 114 of the second inner member 110 relative to the fourth outer member 52. Once the second portion 104 and the fourth portion 114 are positioned relative to the third outer member 42 and the fourth outer member 52 respectively, the second portion 104, and thereby the first inner member 100, and the fourth portion 114, and thereby the second inner member 110, are connected (e.g., fastened, coupled) to the third outer member 42 and the fourth outer member 52 respectively.

In an example embodiment, the second portion 104 of the first inner member 100 includes hole 106 and the fourth portion 114 of the second inner member 110 includes hole 116. The third outer member 42 includes the first plurality of holes 48 and the fourth outer member 52 includes a second plurality of holes 58. The first plurality of holes 48 is used to adjustably connect the second portion 104 of the first inner member 100 to the third outer member 42. The second plurality of holes 58 is used to adjustably connect the fourth portion 114 of the second inner member 110 to the fourth outer member 52. The first plurality of holes 48 and the second plurality of holes 58 enable the first inner member 100 and the second inner member 110 respectively to be adjustably connected to the third outer member 42 and the fourth outer member 52 respectively.

The holes of the first plurality of holes 48 and second plurality of holes 58 many have any spacing between each other whether uniform or irregular. In an example embodiment, the holes of the second plurality of holes 58 are uniformly spaced with a distance 66 between each hole. The holes of the first plurality of holes 48 are similarly uniformly spaced. Holes of the first plurality of holes 48 and the second plurality of holes 58 that are the same distance from the second brace 60 may be referred to as corresponding holes.

In an example embodiment, adjustment of the second adjustment mechanism is accomplished by moving first inner member 100 and the second inner member 110 toward or away from the second brace 60 to align the hole 106 with one of the holes of the first plurality of holes 48 and the hole 116 with one of the holes of the second plurality of holes 58, preferably corresponding holes. Once the holes align, the pin 108 is used to fixedly connect the first inner member 100 to the third outer member 42 and the pin 118 is used to fixedly connect the second inner member 110 to the fourth outer member 52. Although the position of the first inner member 100 and the position of the second inner member 110 may be adjusted with respect to the third outer member 42 and the fourth outer member 52, once the adjustment has been made and the pins 108 and 118 inserted, the first inner member 100 and the second inner member 110 cannot move relative to the third outer member 42 and the fourth outer member 52 respectively.

The hole 106, the hole 116, and each hole of the first plurality of holes 48 and the second plurality of holes 58 are drilled entirely through the first inner member 100, the second inner member 110, the third outer member 42 and the fourth outer member 52 respectively so that the pins 108 and 118 may be placed through the align holes to connect the first inner member 100 to the third outer member 42 and the second inner member 110 to the fourth outer member 52. The pins 108 and 118 interfere with the sides of the holes to achieve the connection.

If the holes 106 and 116 align with the holes of the first plurality of holes 48 and the second plurality of holes 58 that are furthest away from the second brace 60, then the second adjustment mechanism has reached its maximum limit for moving the first support 20 away from the second support 40. If the holes 106 and 116 align with the holes of the first plurality of holes 48 and the second plurality of holes 58 that are closest to the second brace 60, then the second adjustment mechanism has reached its minimum limit for moving the first support 20 away from the second support 40. The holes 106 and 116 may align with any of the holes of the first plurality of holes 48 and the second plurality of holes 58, preferably corresponding holes.

Although it is likely most convenient to operate the second adjustment mechanism prior to operating the locking mechanism 120 to secure the load, the second adjustment mechanism may be used at any time to increase or decrease the length of the load securing device and thereby the length of the gap that it can span. Adjusting the length of the load securing device so that the locking mechanism 120 may be moved into the locked position to secure the load may require iterations of adjusting the second adjustment mechanism and adjusting using the locking mechanism 120.

As best seen in FIGS. 1, 6-7, 11-12 and 14, the holes of the first plurality of holes 48 are spaced apart along a length of the third outer member 42. The holes of the first plurality of holes 48 are spaced apart along a length of the third outer member 42 between a first position proximate to the second brace 60 and a second position distal from the second brace 60. The holes of the second plurality of holes 58 are spaced apart along a length of the fourth outer member 52. The holes of the second plurality of holes 58 are spaced apart along a length of the fourth outer member 52 between the first position proximate to the second brace 60 and the second position distal from the second brace 60. In an example embodiment, the holes of the first plurality of holes 48 and of the second plurality of holes 58 are spaced apart along the horizontal line 62.

The first inner member 100 and the second inner member 110 may be positioned so that any hole of the first plurality of holes 48 and the second plurality of holes 58 aligns with the hole 106 of the first inner member 100 and the hole 116 of the second inner member 110. Aligning the holes 106 and 116 with the one hole of the first plurality of holes 48 and the second plurality of holes 58 that are closest (e.g., proximate) to the second brace 60 positions the second support 40 closer to the first support 20. Aligning the holes 106 and 116 with the one hole of the first plurality of holes 48 and the second plurality of holes 58 that are furthest (e.g., distal) from the second brace 60 positions the second support 40 further away from the first support 20.

While the hole 106 is aligned with one hole of the first plurality of holes 48, the pin 108 is positioned in (e.g., inserted in, through) the hole 106 and the one hole of the first plurality of holes 48 to connect the first inner member 100 to the third outer member 42. While the hole 116 is aligned with one hole of the second plurality of holes 58, the pin 118 is positioned in (e.g., inserted in, through) the hole 116 and the one hole of the second plurality of holes 58 to connect the second inner member 110 to the fourth outer member 52. Because the pins 108 and 118 may be removed from their respective holes so that the position of the first inner member 100 and the second inner member 110 may be adjusted (e.g., change) with respect to the third outer member 42 and the fourth outer member 52, the connection is described as adjustable. While the pins 108 and 118 are not positioned in their respective holes, the position of the first inner member 100 and the second inner member 110 may be adjusted with respect to the third outer member 42 and the fourth outer member 52. However, once the pins 108 and 118 have been inserted into the respective holes, the first inner member 100 and the second inner member 110 are connected to the third outer member 42 and the fourth outer member 52 and cannot be moved. So, once the pins 108 and 118 of been inserted into the respective holes, the first inner member 100 and the second inner member 110 are fixedly connected to the third outer member 42 and the fourth outer member 52 respectively.

In an example embodiment, the hole 106 and the hole 116 are positioned in the second portion 104 of the first inner member 100 and the fourth portion 114 of the second inner member 110 respectively. So, the pin 108 connects the second portion 104 of the first inner member 100 to the third outer member 42 and the pin 118 connects the fourth portion 114 of the second inner member 110 to the fourth outer member 52.

As discussed above, in an example embodiment, the third outer member 42 includes the channel 44 and the fourth outer member 52 includes a channel 54. The first inner member 100 and the second inner member 110 may be adjusted with respect to the third outer member 42 and the fourth outer member 52 as follows. The second portion 104 of the first inner member 100 is positioned in the channel 44 to align the hole 106 of the first inner member 100 with one hole of the first plurality of holes 48. The hole 106 may be lined with any one hole of the first plurality of holes 48, thereby enabling adjustment of the position of the first inner member 100 with respect to the third outer member 42. While the hole 106 is aligned with the one hole of the first plurality of holes 48, the pin 108 is positioned in (e.g., inserted in, through) the hole 106 and the one hole of the first plurality of holes 48. The pin 108 interferes with movement of the second portion 104 of the first inner member 100 in the channel 44 thereby connecting the second portion 104 of the first inner member 100 to the third outer member 42. So, the first inner member 100 adjustably connects to the third outer member 42.

With respect to the second inner member 110 and the fourth outer member 52, the fourth portion 114 of the second inner member 110 is positioned in the channel 54 to align the hole 116 of the second inner member 110 with one hole of the second plurality of holes 58. The hole 116 may be lined with any one hole of the second plurality of holes 58, thereby enabling adjustment of the position of the second inner member 110 with respect to the fourth outer member 52. While the hole 116 is aligned with the one hole of the second plurality of holes 58, the pin 118 is positioned in (e.g., inserted in, through) the hole 116 and the one hole of the second plurality of holes 58. The pin 118 interferes with movement of the fourth portion 114 of the second inner member 110 in the channel 54 thereby connecting the fourth portion 114 of the second inner member 110 to the fourth outer member 52. So, the second inner member 110 adjustably connects to the fourth outer member 52.

F. Locking Mechanism

As discussed above, the locking mechanism 120 moves between an adjustment position and a locked position. In the adjustment position, the locking mechanism 120 operates to move the first support 20 away from the second support 40. In the locked position, the locking mechanism 120 operates to fix (e.g., hold) the distance between the first support 20 and the second support 40. The locking mechanism 120 is placed in the locked position when the first support 20 and the second support 40 spans the gap between the wall (e.g., 12, 14) and the cargo 16. In the locked position, the locking mechanism 120 holds the first support 20 and the second support 40 at their set positions (e.g., distance between them) so that the load holding device presses against the wall (e.g., 12, 14) and the cargo 16. In the locked position, the locking mechanism 120 applies a force against the wall and against the cargo 16 to secure the cargo 16. The locking mechanism 120 maintains the force between the wall and the cargo 16 as long as a locking mechanism 120 is in the locked position.

In an implementation, the locking mechanism 120 includes a rachet portion 122, an anchor portion 124, the rachet pin 126 and the hinge pin 128. The locking mechanism 120 may further include a cross support 130 attached to the rachet portion 122 and a cross support 132 attached to the anchor portion 124. The cross supports 130 and 132 serve to strengthen and stiffen the rachet portion 122 and the anchor portion 124 respectively. The rachet pin 126 is connected (e.g., coupled) to the rachet portion 122.

While in the adjustment position, the locking mechanism 120 is operable to push against the first rack 70 and/or the second rack 80 to move the first support 20 away from the second support 40 to increase the distance between the first support 20 and the second support 40 and thereby the distance between the first brace 28 and the second brace 60. While in the locked position, the locking mechanism 120 is operable to push against the first rack 70 and/or the second rack 80 to fix the distance between the first support 20 and the second support 40 and thereby the distance between the first brace 28 and the second brace 60. Fixing the distance between the first support 20 and the second support 40 and thereby between the first brace 28 and the second brace 60 secures the cargo 16 by applying a force between the wall (e.g., 12, 14) and the cargo 16.

In an example embodiment, the locking mechanism 120 is pivotally connected to the second support 40. In particular, the locking mechanism 120 is pivotally connected to the third outer member 42 and the fourth outer member 52. As discussed above, the pin 108 is used to connect the first inner member 100 to the third outer member 42 and the pin 118 is used to connect the second inner member 110 to the fourth outer member 52. The pins 108 and 118 also pivotally connect the locking mechanism 120 to the third outer member 42 and the fourth outer member 52 of the second support 40. In particular, the pins 108 and 118 connect the anchor portion 124 to the third outer member 42 and the fourth outer member 52. The anchor portion 124 pivots around the pins 108 and 118. As the anchor portion 124 pivots around the pins 108 and 118, it moves (e.g., up, down) with respect to the horizontal line 62. The anchor portion 124 moves in an arc from slightly below the horizontal line 62 to above the horizontal line 62. As the locking mechanism 120 moves between the adjustment position and the locked position, the anchor portion 124 rotates (e.g., pivots) around the pins 108 and 118 and moves with respect to the horizontal line 62.

In an example embodiment, the hinge pin 128 hingedly connects the rachet portion 122 to the anchor portion 124. The hinge pin 128 connects to the rachet portion 122 on a first side of the rachet portion 122. The rachet pin 126 connects to a second side of the rachet portion 122 opposite the first side. The hinge pin 128 connects to the anchor portion 124 on a first side of the anchor portion 124. The anchor portion 124 pivotally connects to the third outer member 42 and the fourth outer member 52 on a second side of the anchor portion 124. The first side of the anchor portion 124 is opposite the second side of the anchor portion 124.

The rachet portion 122 rotates around the hinge pin 128 with respect to the anchor portion 124. So, the anchor portion 124 rotates around the pins 108 and 118 and the rachet portion 122 rotates around the hinge pin 128 with respect to the rachet portion 122. In the adjustment position, the rachet portion 122 may rotate around the hinge pin at the same time that the anchor portion 124 rotates around the pins 108 and 118. The rachet portion 122 and the anchor portion 124 may be rotated with respect to each other to position the rachet pin 126 relative to the first rack 70 and the second rack 80. In particular, the rachet portion 122 and the anchor portion 124 may be rotated with respect to each other to position the rachet pin 126 next to or against one tooth of the first plurality of teeth 72 and next to or against one tooth of the second plurality of teeth 82, preferably corresponding teeth.

The rachet portion 122 and the anchor portion 124 may be rotated with respect to each other to apply a force on the first rack 70 and the second rack 80 and thereby on the first support 20. In particular, the rachet portion 122 and the anchor portion 124 may be rotated with respect to each other to apply a force on the first support 20 by applying a force via the rachet pin 126 to one tooth of the first plurality of teeth 72 and to one tooth of the second plurality of teeth 82. The force applied on the first support 20 via the rachet pin 126 and the teeth of the first rack 70 and the second rack 80 moves the first support 20 away from the second support 40.

To move from the adjustment position to the locking position, the anchor portion 124 may be rotated around pins 108 and 118 and the rachet portion 122 around the hinge pin 128 until the hinge pin 128 moves to a position that is in line with or slightly below the horizontal line 62. While in the locked position, the rachet portion 122 and the anchor portion 124 continue to apply the force on the first support via the rachet pin 126 and the teeth of the first rack 70 and the second rack 80.

While in the locking mechanism 120 is in the adjustment position, the rachet portion 122 and the anchor portion 124 may be moved relative to the first rack 70 and the second rack 80. In the adjustment position, the rachet portion 122 and the anchor portion 124 may be moved to position the rachet pin 126 proximate to the teeth of the first plurality of teeth 72 and the teeth of the second plurality of teeth 82. While in the adjustment position, the rachet pin 126 may be moved to position the rachet pin 126 above, behind, in front or against any of the teeth of the first plurality of teeth 72 and the second plurality of teeth 82.

Figure 2:
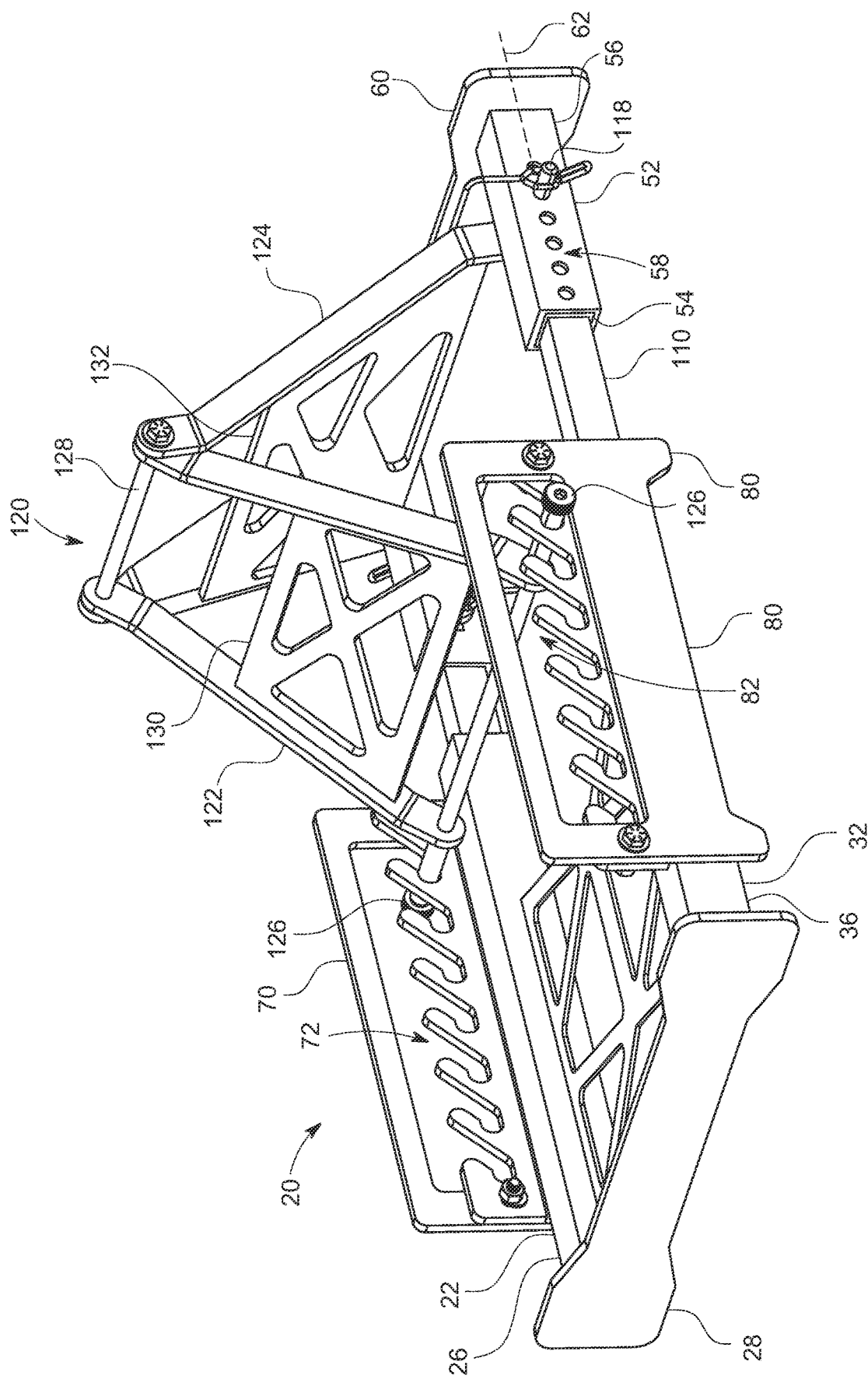
FIG. 2 is a perspective view of the load securing device of FIG. 1 after extension and with the locking mechanism in the adjustment position.
Figure 3:
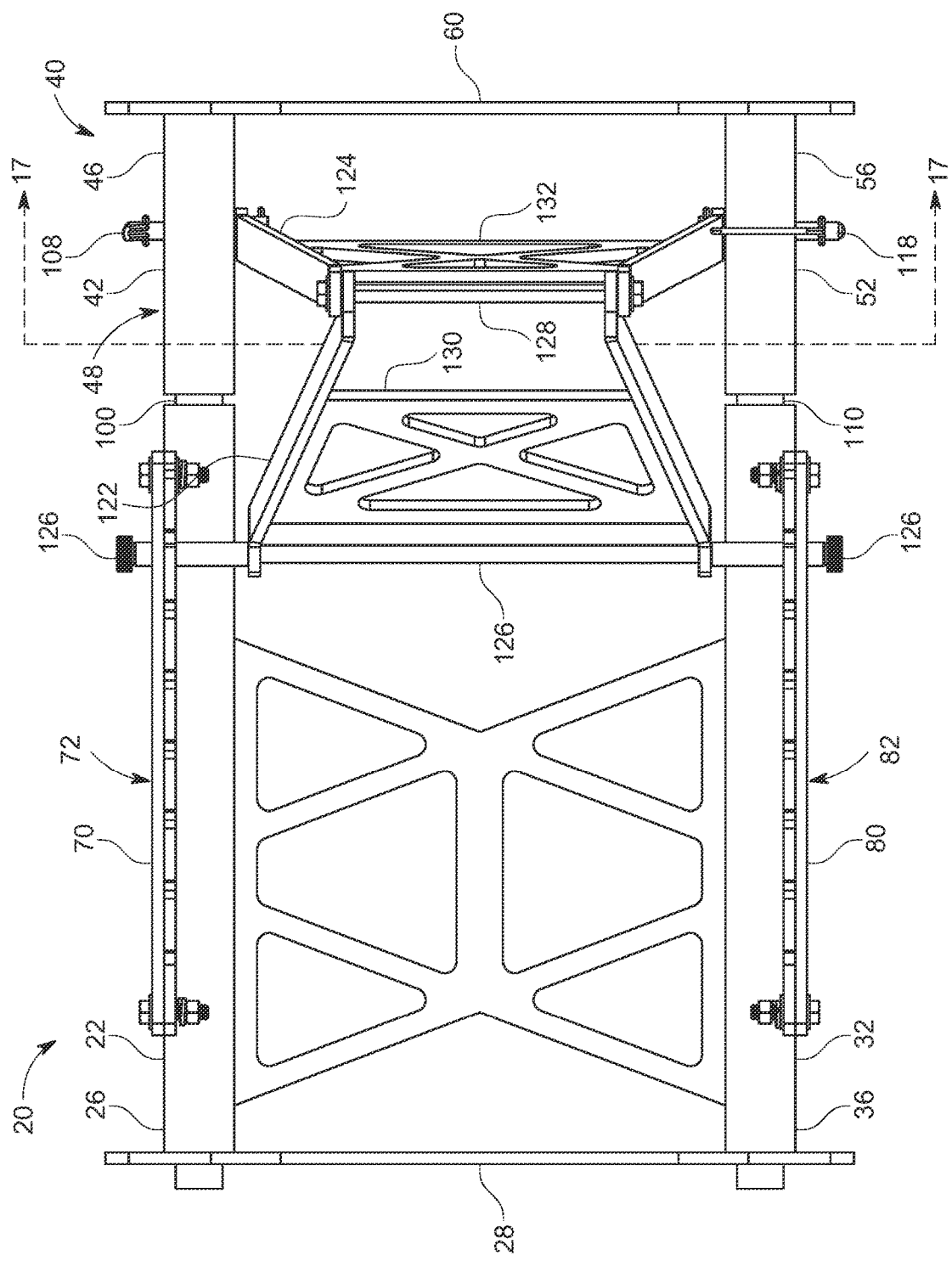
FIG. 3 is a top view of the load securing device of FIG. 1.

For example, referring to FIGS. 1-3, the rachet portion 122 and the anchor portion 124 have been manipulated to position the rachet pin 126 against the base of one tooth of the first plurality of teeth 72 and against one tooth of the second plurality of teeth 82 respectively that is furthest away from the first brace 28. In another example, referring to FIGS. 4 and 7, the rachet portion 122 and the anchor portion 124 have been manipulated to position the rachet pin 126 against the base of one tooth of the first plurality of teeth 72 and against one tooth of the second plurality of teeth 82 closest to the first brace 28. In another example, referring to FIGS. 5 and 6, the rachet portion 122 and the anchor portion 124 have been manipulated to position the rachet pin 126 against the base of one tooth of the first plurality of teeth 72 and against one tooth of the second plurality of teeth 82 that is proximate to the middle of the first rack 70 and the second rack 80. In FIGS. 1-4 and 6, identified in this paragraph, the locking mechanism 120 is in the adjustment position because the hinge pin 128 is positioned above the horizontal line 62. While the locking mechanism 120 is in the adjustment position, the hinge pin 128 is positioned above the horizontal line 62.

As best seen in FIGS. 1-2, 6 and 11, while the locking mechanism 120 is in the adjustment position and the rachet pin 126 may be moved along the first rack 70 and the second rack 80 to position the rachet pin 126 against the base of any tooth of the first plurality of teeth 72 and the second plurality of teeth 82. Once the rachet pin 126 is positioned against the base of the teeth, the hinge pin 128 may be pressed down, toward the horizontal line 62. Pressing the hinge pin 128 downward moves the rachet portion 122, the anchor portion 124 and the rachet pin 126 push against the pins 108 and 118 to apply a pushing force against the teeth of the first rack 70 and the second rack 80. Since the anchor portion 124 is anchored by pins 108 and 118, the pushing force is directed against the teeth. Because of the shape of the teeth, the rachet pin 126 is trapped behind the teeth and cannot avoid directing the pushing force onto the teeth and thereby on to the first rack 70 and the second rack 80. In turn, the first rack 70 and the second rack 80 transfer the pushing force to the first support 20. Since the first support 20 is slidably couple to the first inner member 100 and the second inner member 110, the pushing force causes the first support 20 to slide along the first inner member 100 and the second inner member 110 to move away from the second support 40. As the first support 20 and the second support 40 move away from each other, the first brace 28 and the second brace 60 move away from each other.

For example, as best shown in FIGS. 1 and 3, the locking mechanism 120 is positioned to apply a pushing force against the teeth of the first rack 70 and the second rack 80 that are farthest away from the first brace 28. Prior to pushing down on the hinge pin 128, the first support 20 is close (e.g., proximate) to the second support 40. In FIG. 2, a downward force has been applied to the hinge pin 128. Note that in FIG. 1, the hinge pin 128 is positioned further away from the horizontal line 62 than in FIG. 2. As the hinge pin 128 is pushed down, the pushing force is applied by the rachet pin 126, the rachet portion 122 and the anchor portion 124 on the teeth of the first rack 70 and the second rack 80. As shown in FIG. 2, the pushing force has pushed the first support 20 away from the second support 40. Since the hinge pin 128 in FIG. 2 is still positioned above the horizontal line 62, the hinge pin 128 may be pressed further down to further move the first support 20 farther away from the second support 40.

When the hinge pin 128 moves to be next to or below the horizontal line 62, the locking mechanism 120 moves from the adjustment position into the locked position. As the hinge pin 128 is pressed down, the orientation of the rachet portion 122 and the anchor portion 124 flattened so that they are oriented more in parallel with the horizontal line 62. When the orientations of the rachet portion 122 and the anchor portion 124 are nearly flat, or in other words when the locking mechanism 120 enters the locked position, the first support 20 has been moved as far as it can be moved away from the second support 40 for the tooth position of the rachet pin 126.

Figure 7:
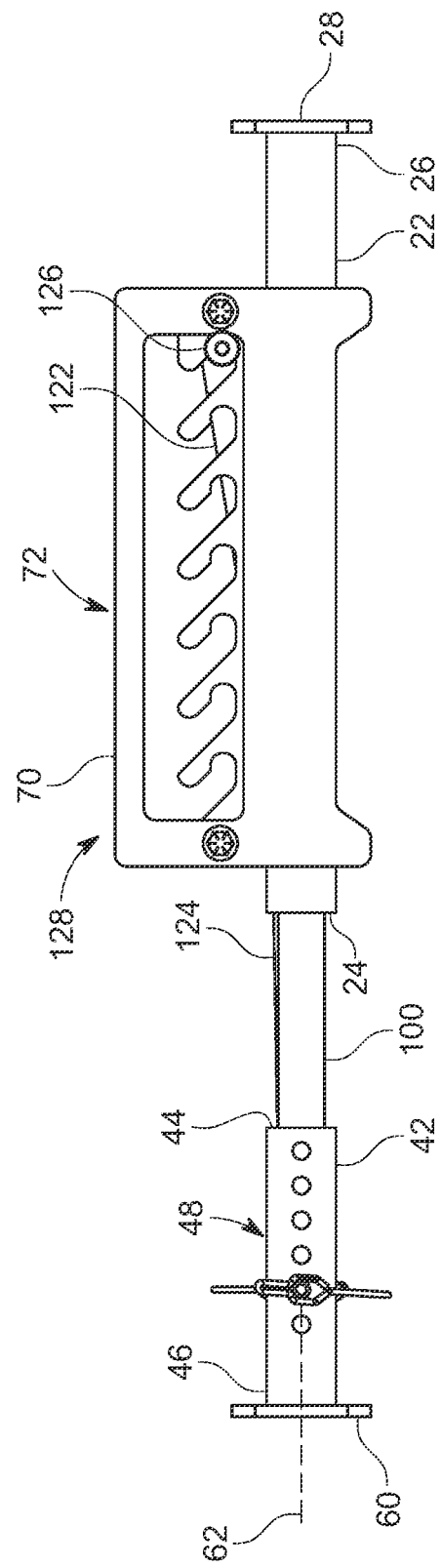
FIG. 7 is a side view of the load securing device of FIG. 1 after extension and with the locking mechanism in the locked position.
Figure 8:
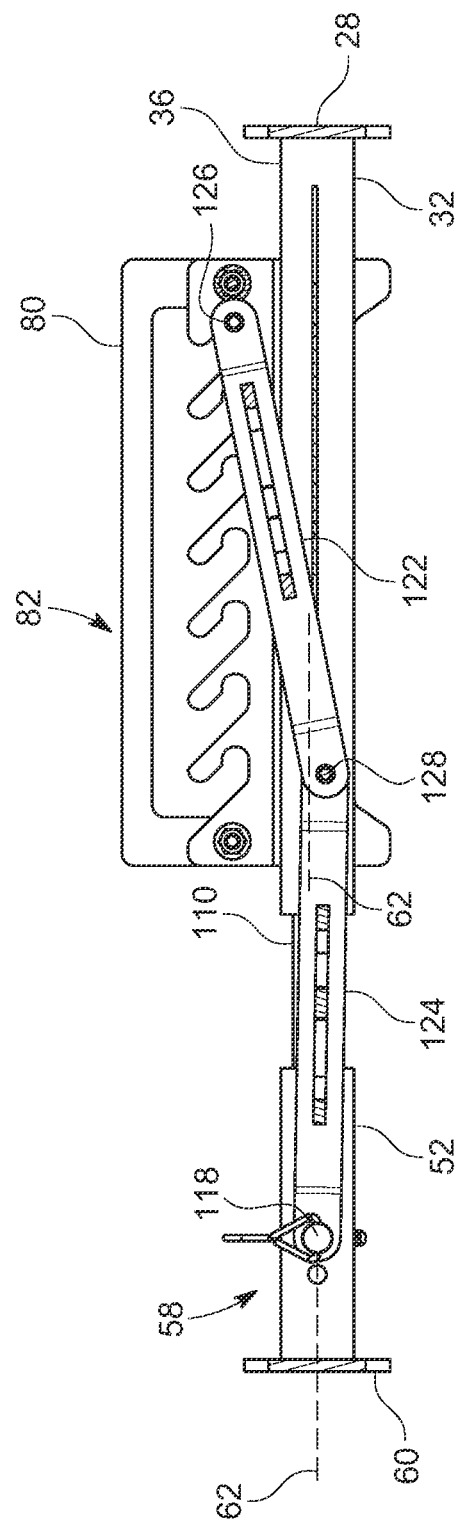
FIG. 8 is a cross-section of the load securing device of FIG. 5 after extension and with the locking mechanism in the locked position.
Figure 10A:
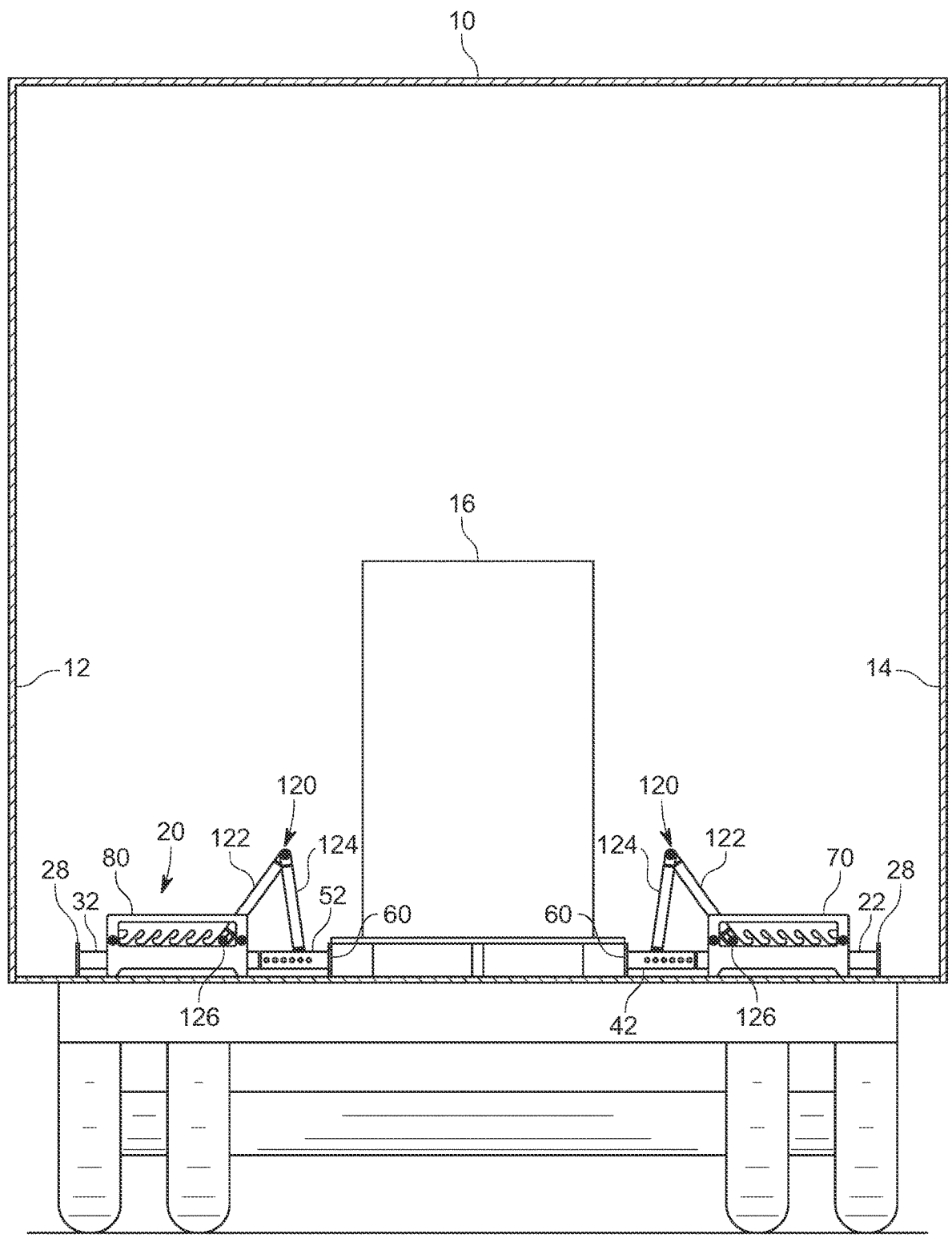
FIG. 10A is a side view of the pair of load securing devices of FIG. 9A positioned against the load within a container prior to extension and with the locking mechanism in the adjustment position.
Figure 10B:
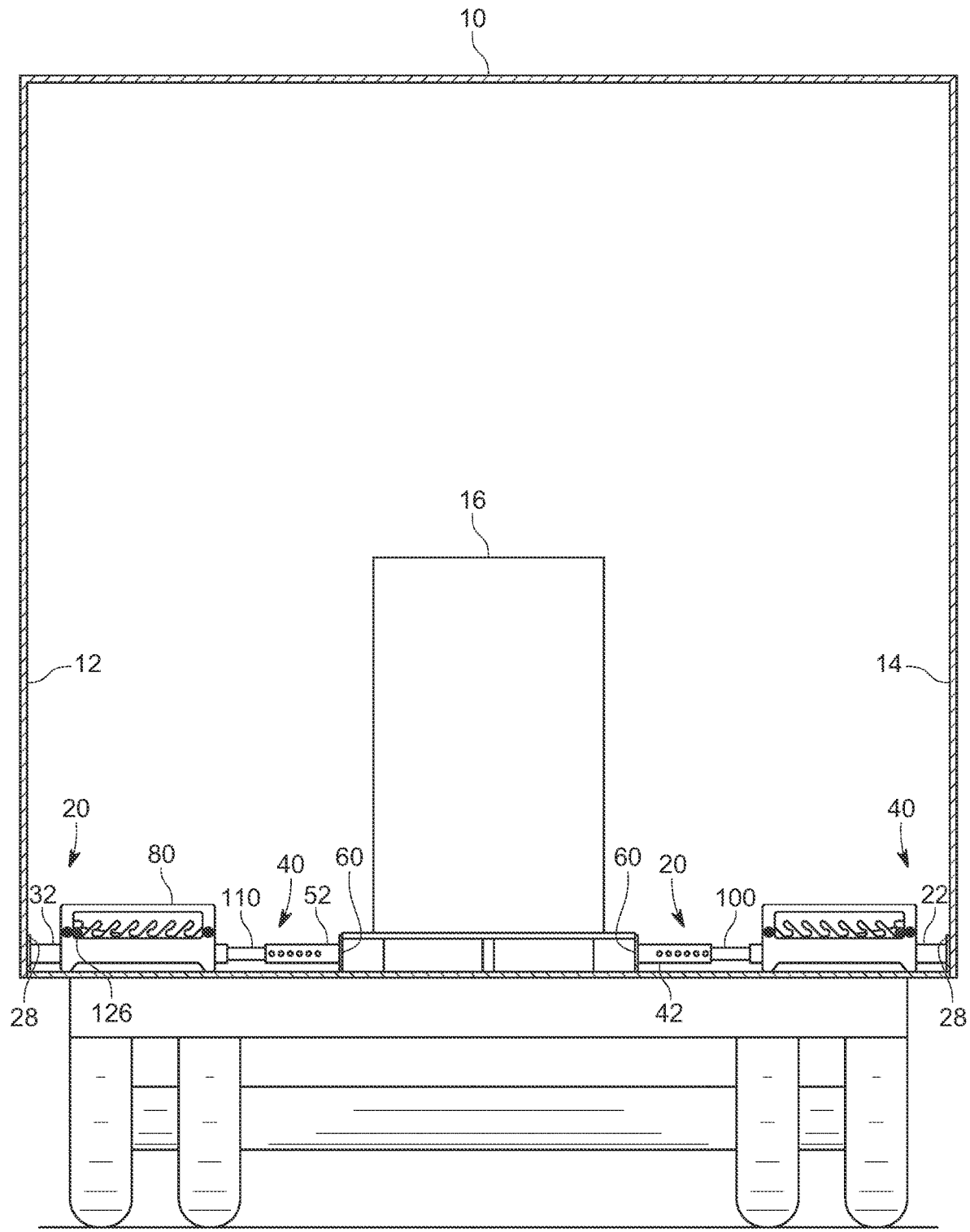
FIG. 10B is a side view of the pair of load securing devices of FIG. 9B after extension and with the locking mechanism in the locked position to secure the load.
Figure 11:
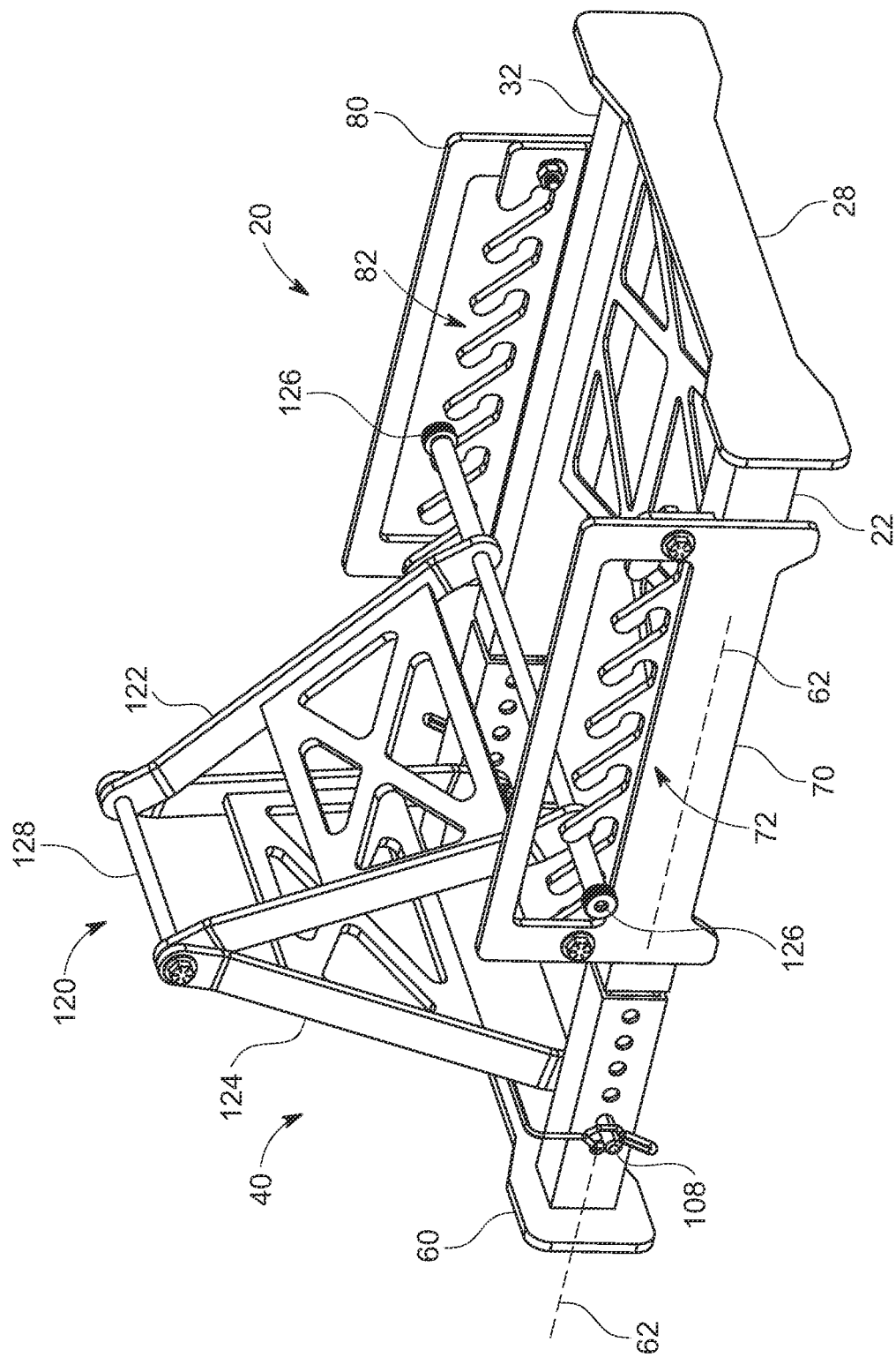
FIG. 11 is another perspective view of the load securing device of FIG. 1 with the locking mechanism in the adjustment position.
Figure 12:
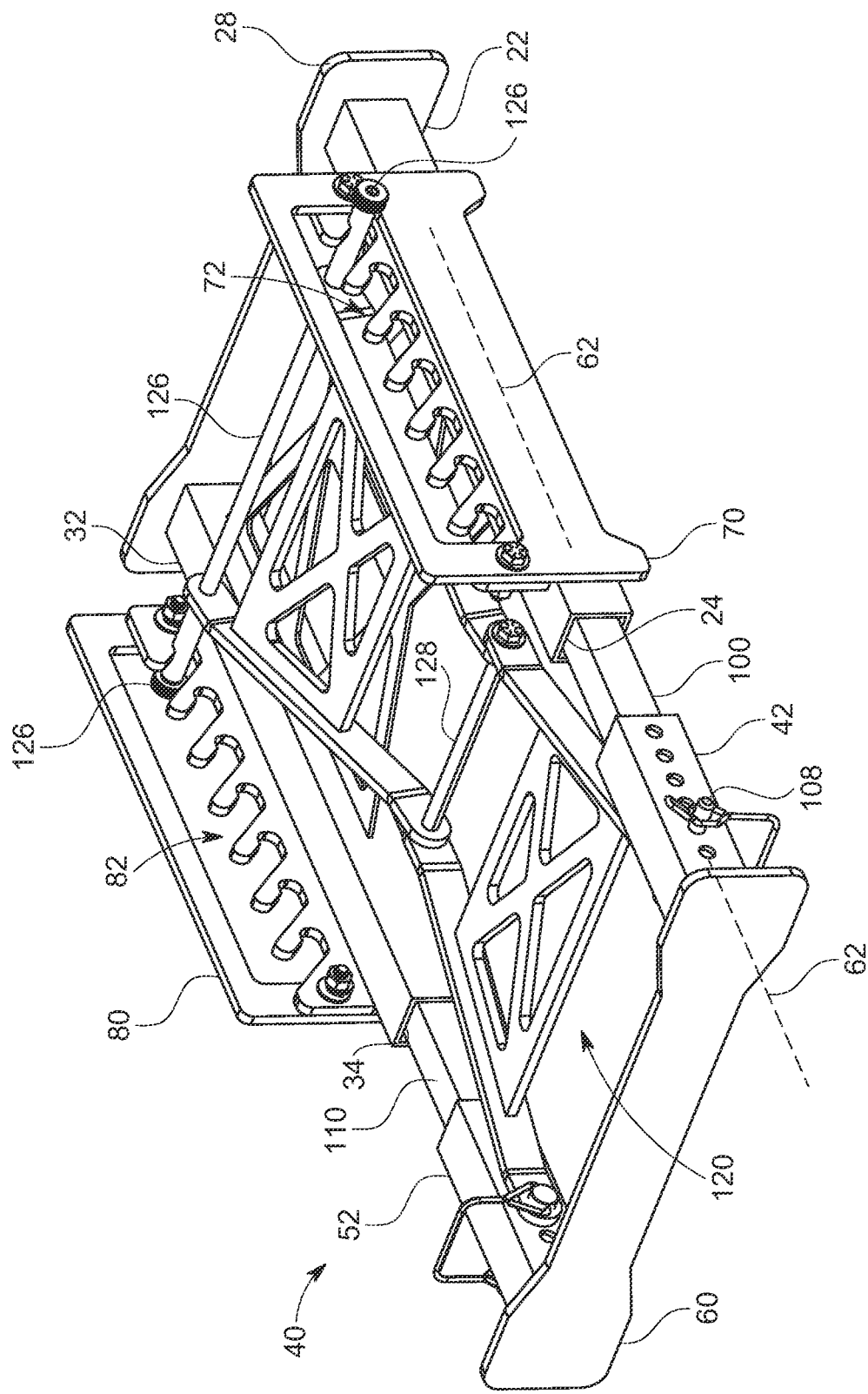
FIG. 12 is another perspective view of the load securing device of FIG. 1 after extension and with the locking mechanism in the locked position.
Figure 13:
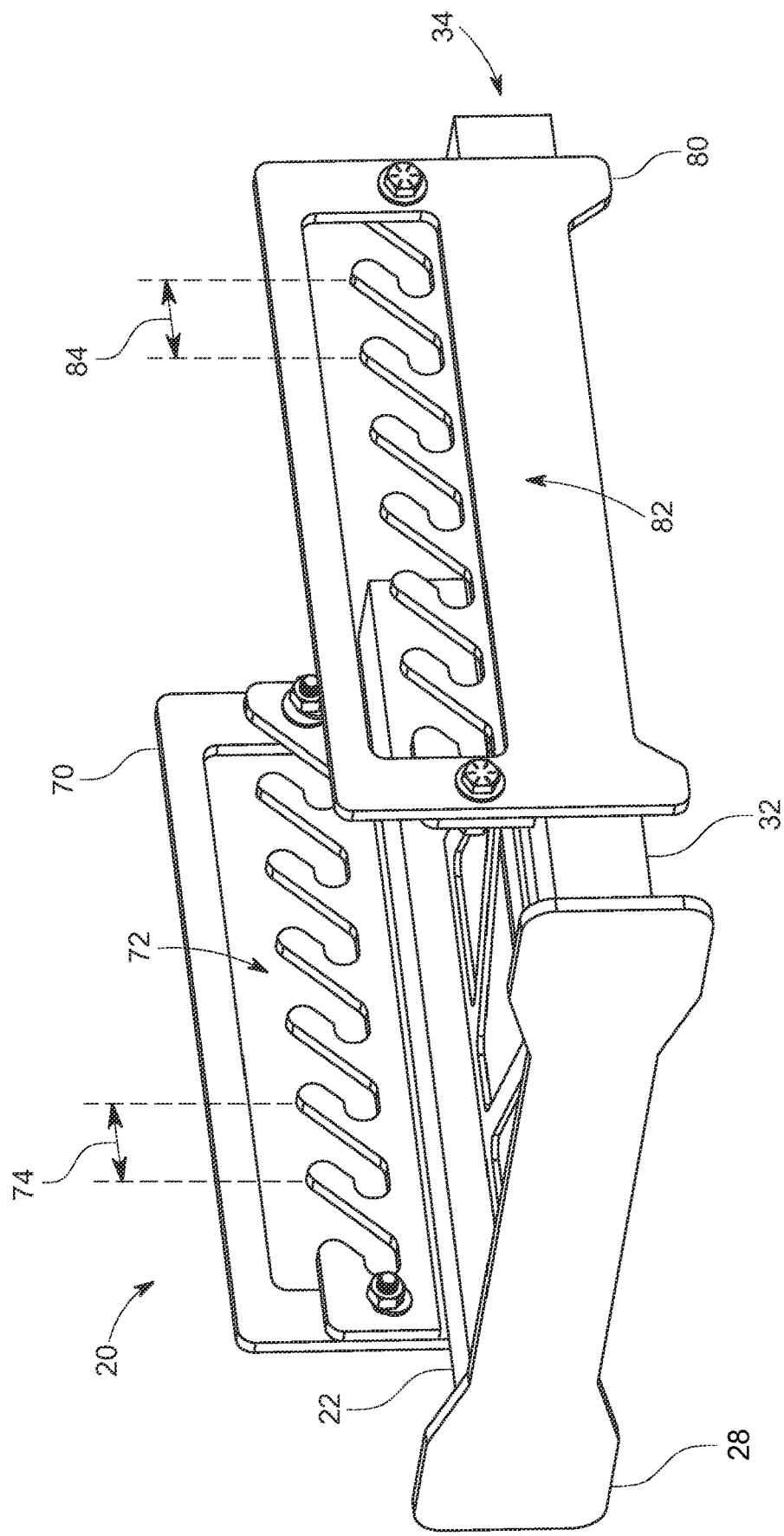
FIG. 13 is a perspective view of the first support of the load securing device of FIG. 1.
Figure 14:
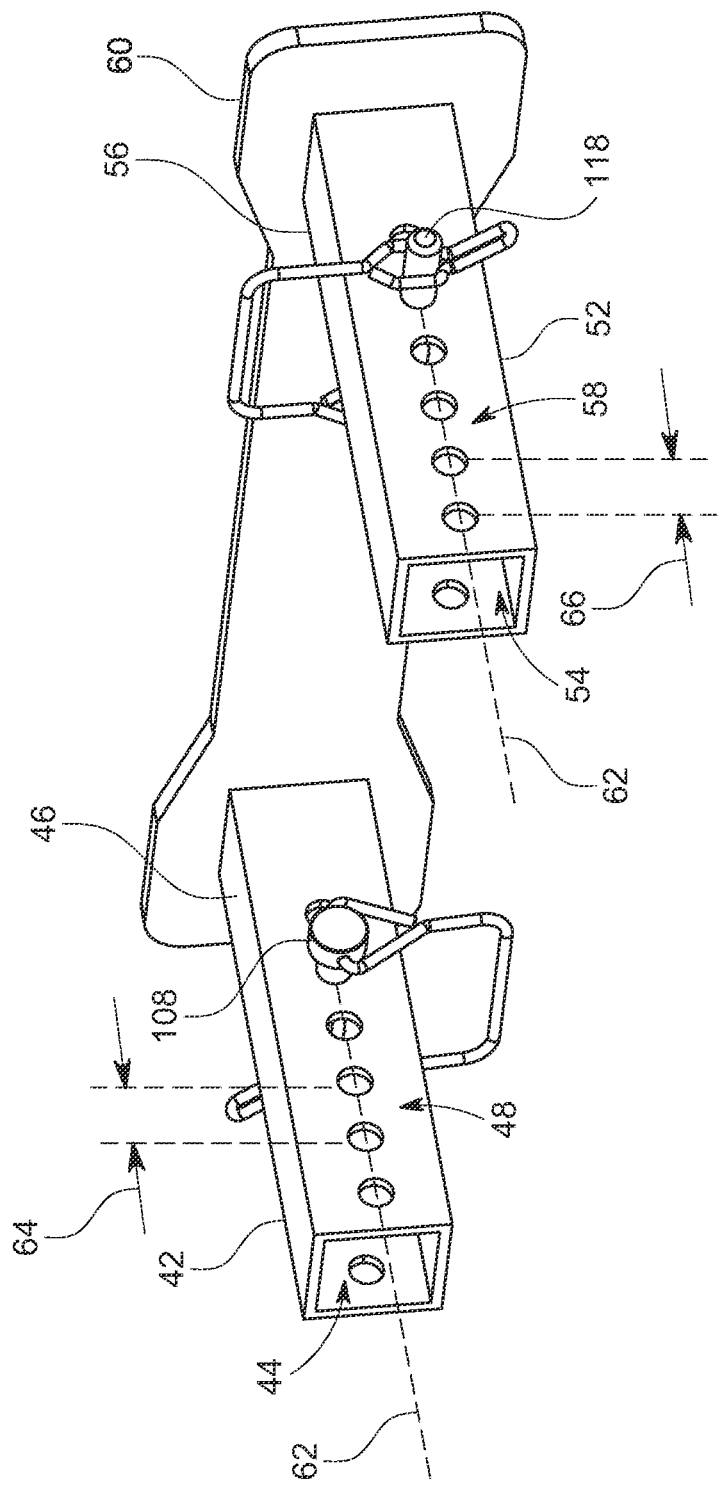
FIG. 14 is a perspective view of the second support of the load securing device of FIG. 1.
Figure 15:
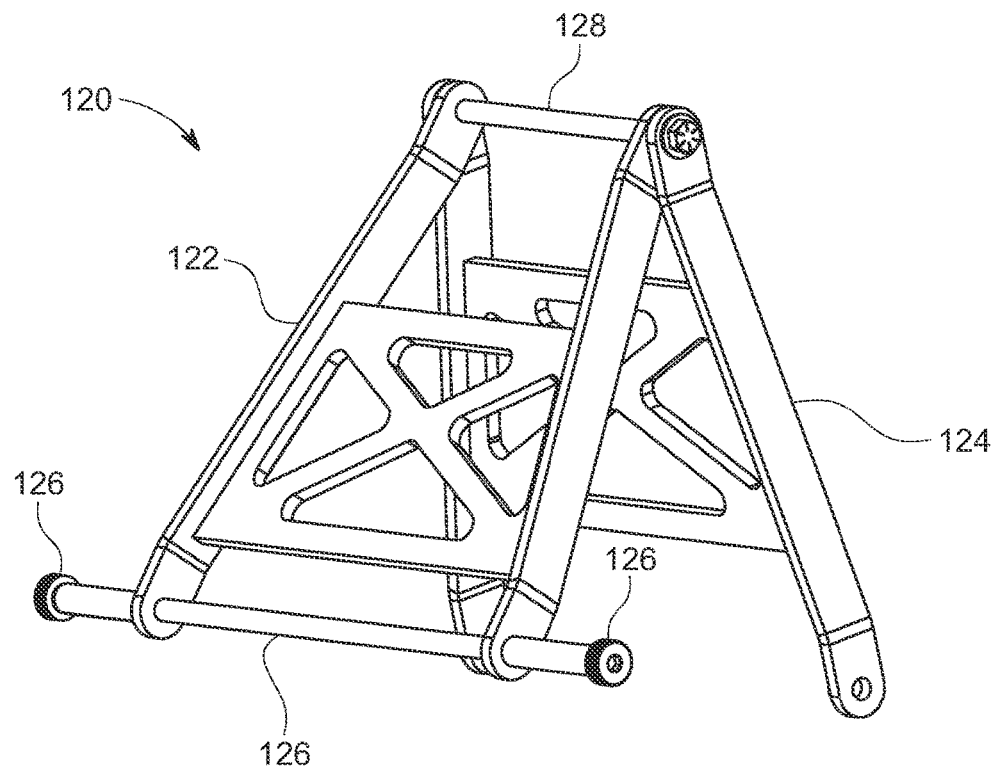
FIG. 15 is a perspective view of the locking mechanism of the load securing device of FIG. 1.
Figure 16:
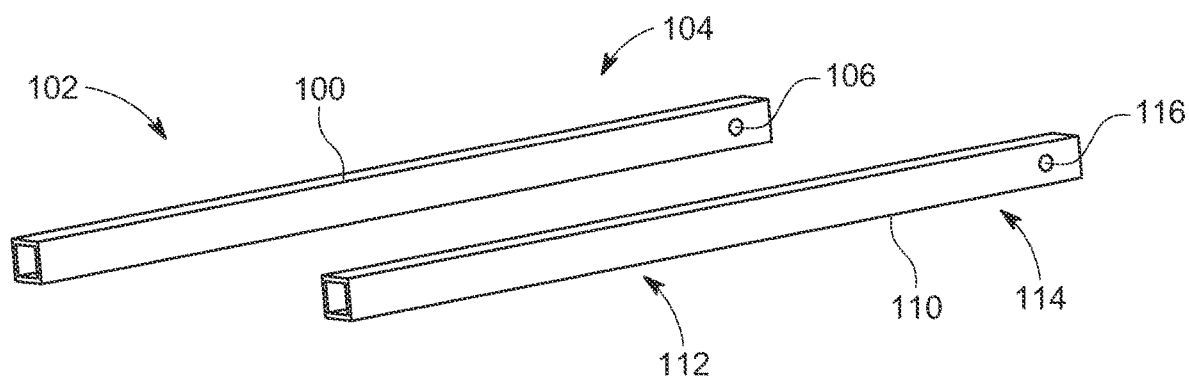
FIG. 16 is a perspective view of the first inner member and the second inner member of the load securing device of FIG. 1.

For example, in FIG. 10A, the locking mechanisms 120 of the load securing devices on either side of the cargo 16 are in the adjustment position because the hinge pin 128 is positioned above the horizontal line 62. In FIG. 10B, the hinge pin 128 has been pressed down so that the hinge pin 128, as shown in FIGS. 7-8, is positioned at (e.g., along, even with) or slightly below the horizontal line 62, so the locking mechanism 120 has been moved to the locked position. Note that in FIGS. 7 and 8, while the locking mechanism 120 is in the locked position, the anchor portion 124 is substantially flat with respect to the horizontal line 62. The rachet portion 122 is also nearly flat.

While the locking mechanism 120 is in the locked position, the locking mechanism 120 continues to apply the pushing force against the first rack 70 and/or the second rack 80. As shown in FIGS. 9B and 10B, while the locking mechanism 120 is in the locked position, the first brace 28 and the second brace 60 of the two load securing devices extend from the wall (e.g., 12, 14) to the cargo 16. The pushing force provided by the locking mechanism 120 against the first rack 70 and the second rack 80 pushes against the wall and the cargo 16 thereby securing the cargo. Further, while the locking mechanism 120 is in the locked position, the position of the first support 20 is fixed with respect to the position of the second support 40. The pins 108 and 118 are pushing against the anchor portion 124, which is pushing against the rachet portion 122, which is pushing against the rachet pin 126, which is pushing against the teeth of the first rack 70 and the second rack 80. Because the anchor portion 124 and the rachet portion 122 are nearly straight, they hold the first support 20 and the second support 40 at a fixed distance from each other.

In particular, while the locking mechanism 120 is in the locked position, the anchor portion 124, the rachet portion 122 and the rachet pin 126 apply, or continue to apply, the pushing force against one tooth of the first plurality of teeth 72 and against one tooth of the second plurality of teeth 82, preferably corresponding teeth. Since in the locked position the rachet portion 122 and the anchor portion 124 are fully extended (e.g., substantially flat), they cannot further move the first support 20 away from the second support 40, so the locking mechanism 120, while in the locked position, cannot increase the distance between the first support 20 and the second support 40. However, the force of the locking mechanism 120 against the first rack 70 and the second rack 80 also stops movement of the first support toward the second support 40. So, while in the locked position, the locking mechanism 120 holds the first support 20 and the second support 40 at a fixed position. Further, the cargo 16 pushes back against the force provided by the load securing device, so the distance between the first support 20 and the second support 40 cannot increase or decrease.

In the example of FIGS. 9B and 10B, the load securing device on the left of the cargo 16 applies a force between the wall 12 and the cargo 16 to stop the cargo from moving leftward. The load securing device on the right of the cargo 16 applies a force between the wall 14 and the cargo 16 to stop the cargo from moving rightward. The opposing forces hold the cargo 16 in position so that does not move or shift during shipping.

G. Operation of Preferred Embodiment

The use of the load securing device, discussed below, uses two load securing devices to secure the cargo 16 in the trailer 10. As discussed above, a single load securing device may be used to secure the load if the load securing device can press the cargo 16 against one of the walls (e.g., 12, 14) of the trailer 10. This description of the use refers in particular to FIGS. 9A-9B and 10A-10B. The load securing device positioned on the left of the cargo 16, with reference to the drawing, is referred to as the left load securing device, while the other is referred to as the right load securing device.

Figure 9A:
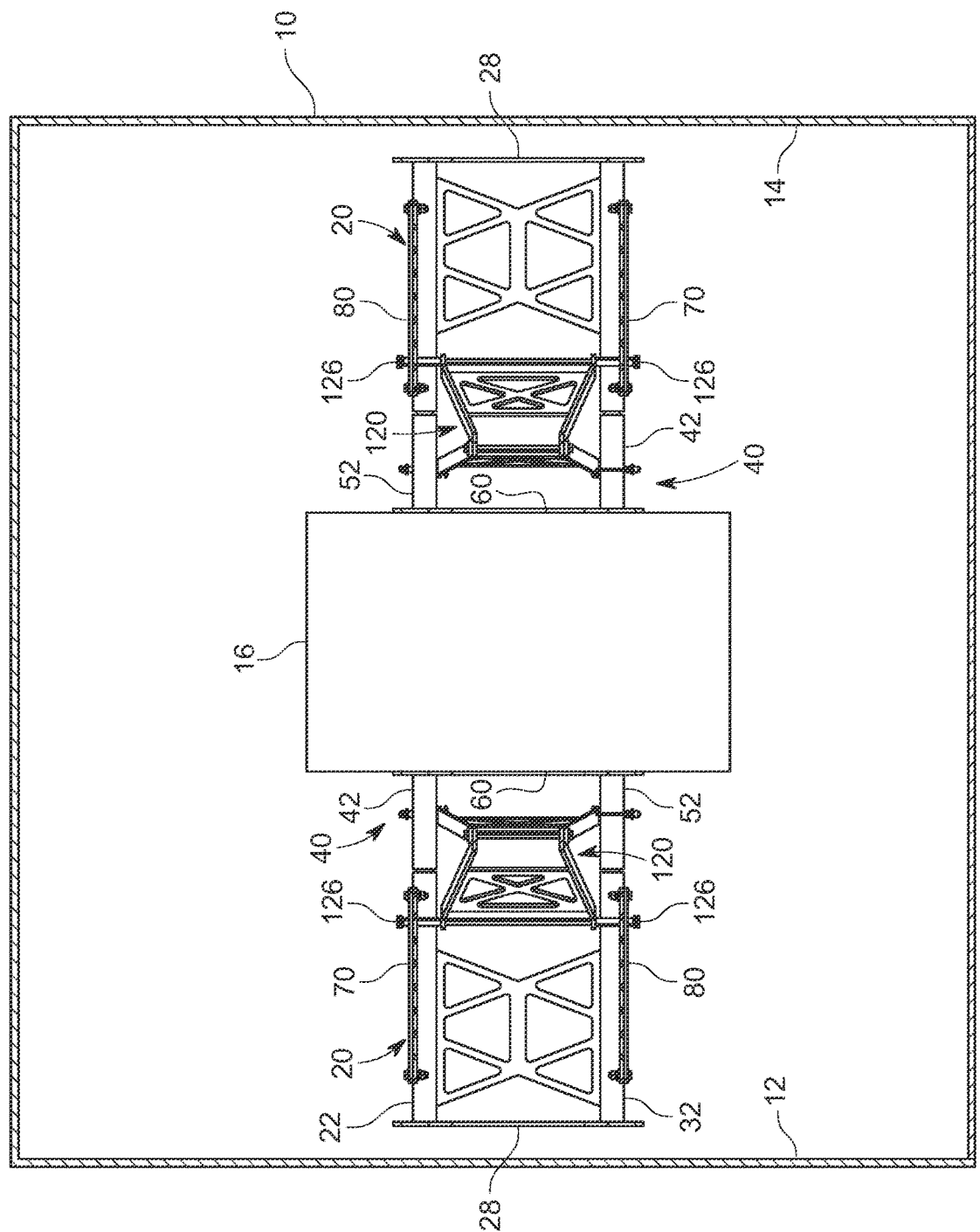
FIG. 9A is a top view of a pair of load securing devices positioned against the load within a container prior to extension and with the locking mechanism in the adjustment position.
Figure 9B:
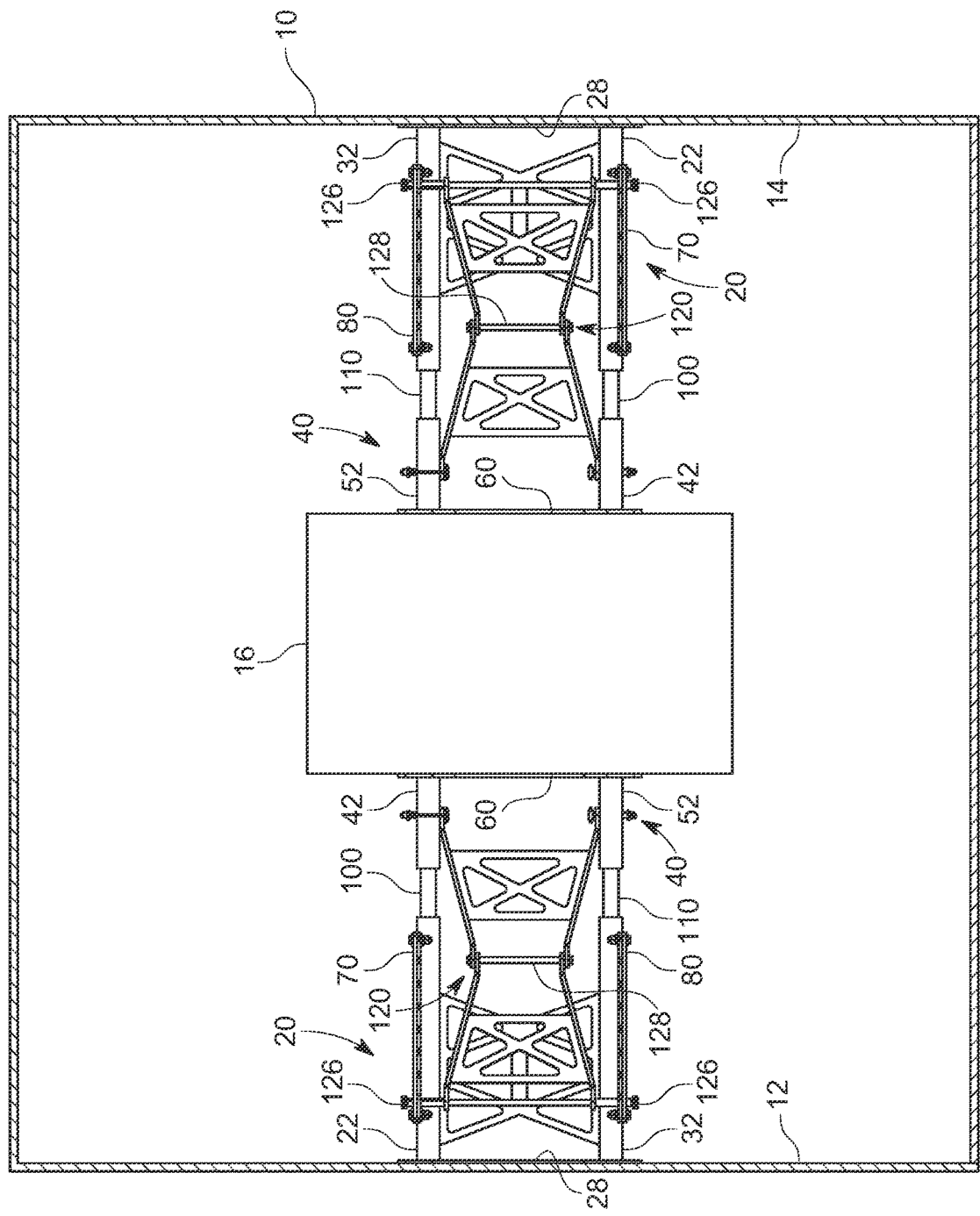
FIG. 9B is a top view of the pair of load securing devices after extension and with the locking mechanism in the locked position to secure the load.

After the load, the cargo 16, is placed in in the trailer 10 between the wall 12 and the wall 14, the left cargo securing device is placed to the left of the cargo 16 and the right cargo securing device is placed to the right of the cargo 16 as shown in FIGS. 9A and 10A. Initially, the load securing devices do not span the gaps between the walls and the cargo 16, so the locking mechanisms 120 of the load securing devices are placed in the adjustment position by raising the hinge pin 128. The person securing the load raises the hinge pin 128 and positions the rachet pin 126 against the teeth of the first rack 70 and the second rack 80 to push the first support 20 away from the second support 40 to span the gap. In particular, the person places the rachet pin 126 against one tooth of the first plurality of teeth 72 of the first rack 70 and against one tooth of the second plurality of teeth 82 of the second rack 80, preferably corresponding teeth, then pushes down on the hinge pin 128. The person places the rachet pin 126 against the teeth most likely to extend the load securing device so that it touches the wall and the cargo 16 while still allowing the locking mechanism 120 to be moved into the locked position.

The load securing devices are shown in FIGS. 9A and 10A prior to extending them to span the gaps. Since the hinge pin 128 is above the horizontal line 62, the locking mechanism 120 of both load securing devices are in the adjustment position. Other figures that show the locking mechanism 120 in the adjustment position prior to extension include FIGS. 1, 3, 6 and 11.

Extending the load securing device so the it reaches between the wall and the cargo 16 may take some trial-and-error adjustments. The second adjustment mechanism, as discussed above, may be adjusted to help span the gap. If the load securing device is too long to fit in the gap, the second adjustment mechanism may be used to shorten the distance between the first support 20 and the second support 40. If the load extending device is too short to fill the gap even after the locking mechanism 120 has pushed the first support 20 as far away as it can from the second support 40, then the second adjustment mechanism may be used to lengthen (e.g., increase) the distance between the first support 20 and the second support 40.

Figure 4:
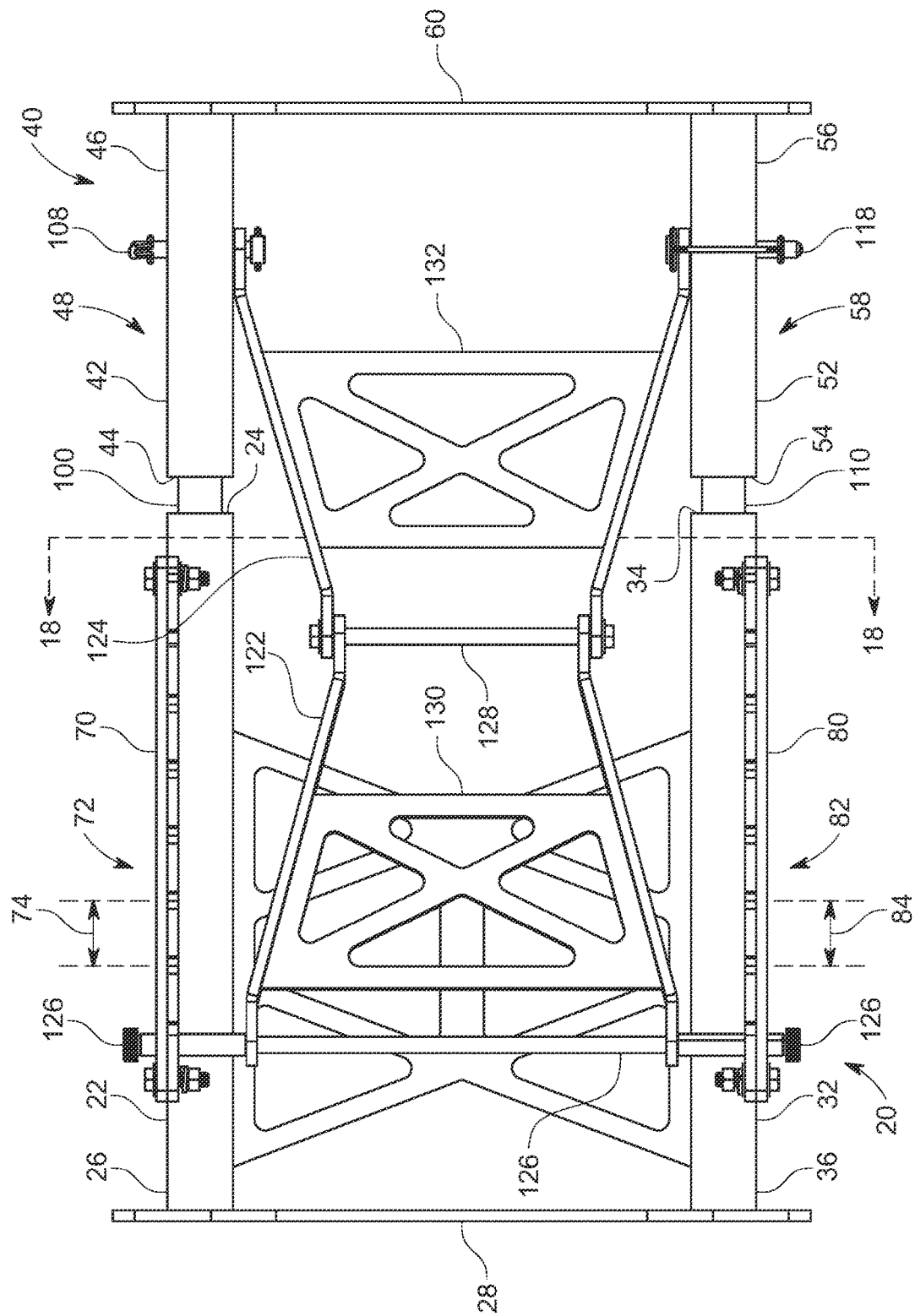
FIG. 4 is a top view of the load securing device of FIG. 1 after extension and with the locking mechanism in the adjustment position.
Figure 5:
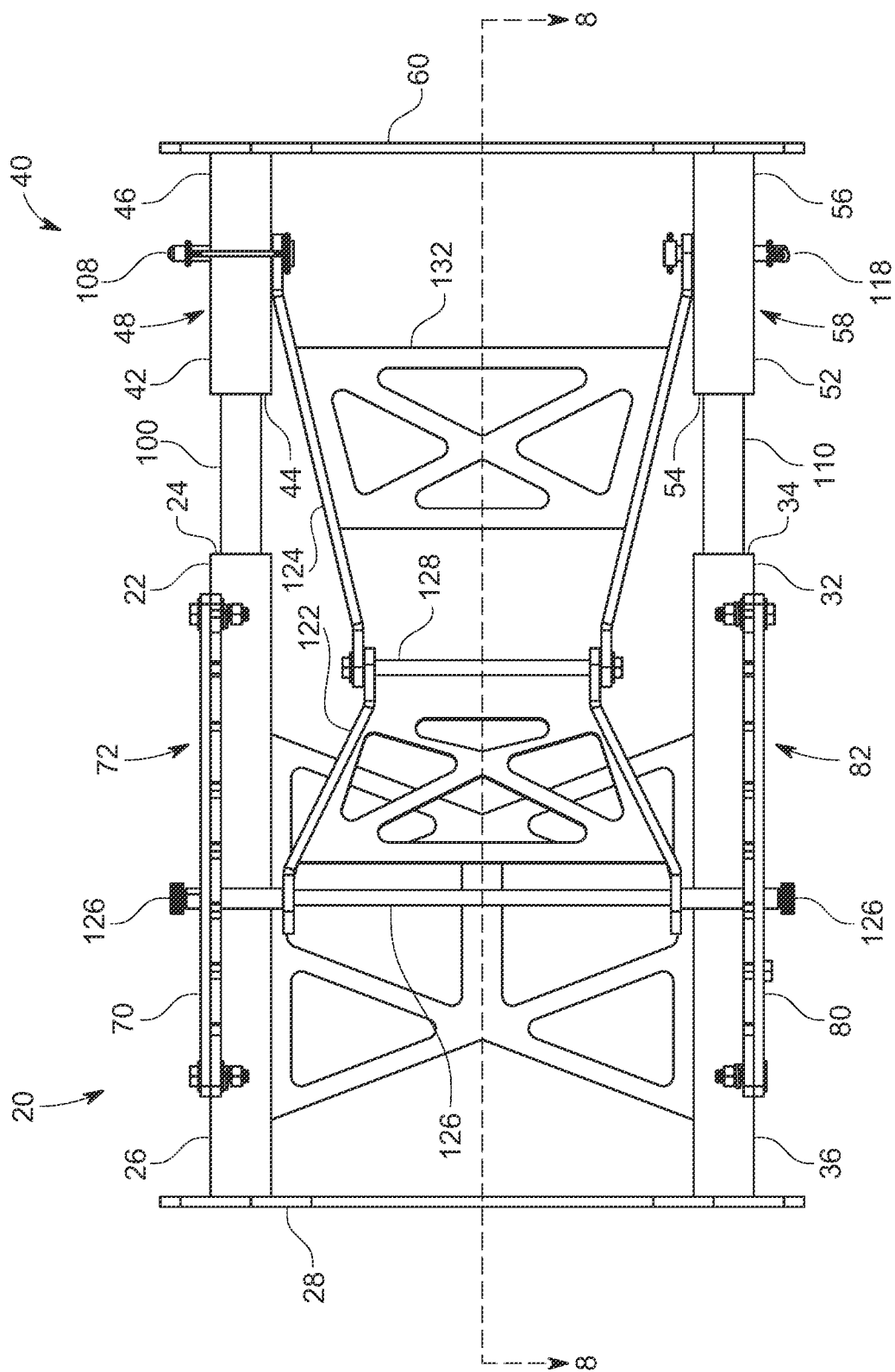
FIG. 5 is a top view of the load securing device of FIG. 1 after extension and with the locking mechanism in the locked position.
Figure 6:
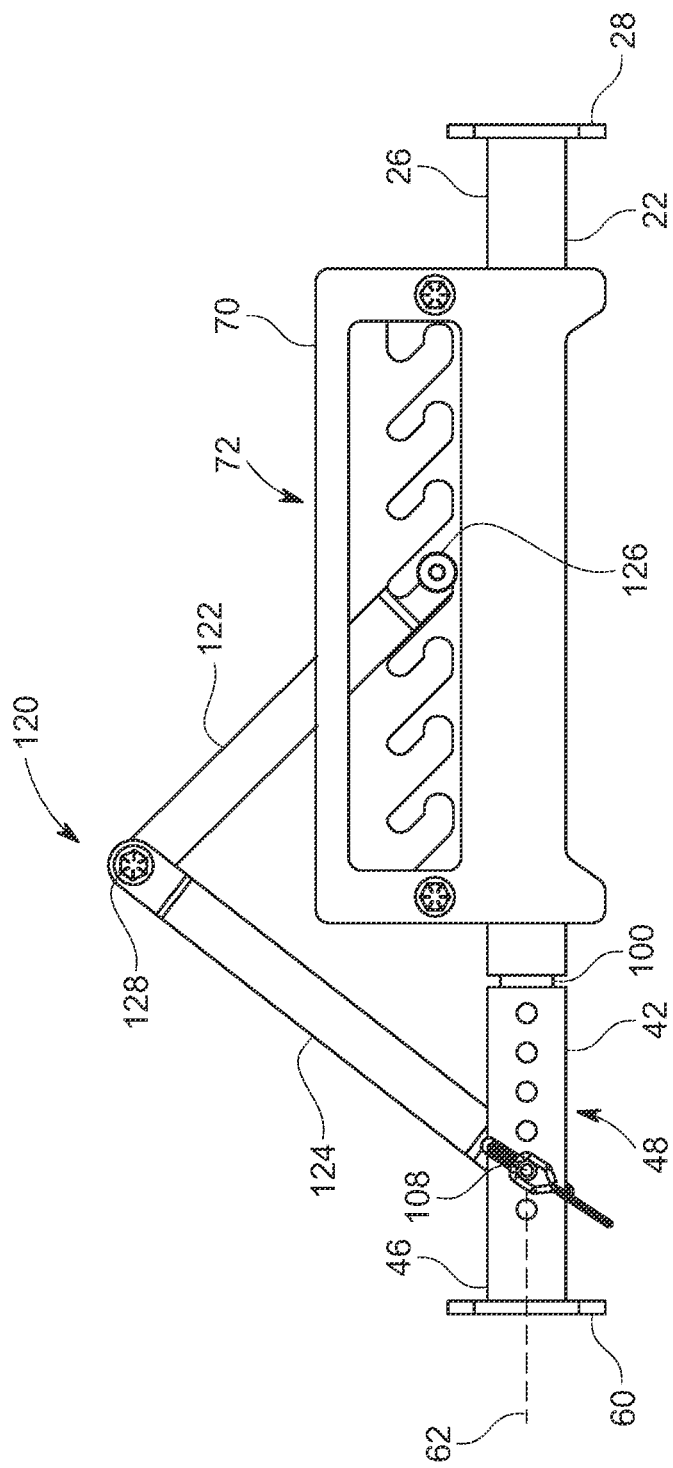
FIG. 6 is a side view of the load securing device of FIG. 1 before extension and with the locking mechanism in the adjustment position.

After the second adjustment mechanism has been set, the locking mechanism 120 (e.g., first adjustment mechanism) may be used to close the gap so that the load securing device spans (e.g., extends) from the wall to the cargo. In FIGS. 9B and 10B, the load securing devices have been extended to extend across (e.g., failed) the gap between the walls 12 and 14 and the cargo 16. Other FIGS. that show the load securing device after the locking mechanism 120 has been operated to move the first support 20 away from the second support 40 (e.g., extend the load securing device) include FIGS. 2, 4-5, 7-8 and 12. However, there are differences between some of these figures. In FIGS. 2 and 4, the locking mechanism 120 is still positioned in the adjustment position because the hinge pin 128 is positioned above the horizontal line 62. In FIGS. 5, 7-8, 9B, 10B and 12, the locking mechanism 120 is in the locked position.

So, in operation, the second adjustment mechanism may be used to preliminarily adjust the length of the load securing devices. The length of a load securing device is defined as the distance between the first support 20 and the second support 40. The locking mechanism 120 may then be used to further extend the load securing device so that it reaches from the wall (e.g., 12, 14) to the cargo 16. Once the load securing device touches the wall and the cargo, the locking mechanism 120 may be moved to the locked position to fix the length of the load securing device and to apply a force between the wall and the cargo 16 to secure to cargo 16. Since there are two load securing devices, the left load securing device pushes to the right against the cargo 16 and the right load securing device pushes to the left against the cargo 16 to firmly hold the cargo 16 in place so that it does not move or shift during shipping.

Moving the locking mechanism 120 to the locked position may require the user to reposition the rachet pin 126 with respect to the teeth of the first plurality of teeth 72 and the second plurality of teeth 82. While the locking mechanism 120 is in the adjustment position, the user may place the rachet pin 126 against any of the teeth to extend the load securing device. Placing the rachet pin 126 against teeth farther away from the first brace 28 causes the load securing device to extend more than placing the rachet pin 126 against teeth that are closer to the first brace 28. As the user presses down on the hinge pin 128 to move the first support 20 away from the second support 40, the first brace 28 may touch the wall and the second brace 60 the cargo 16 while the hinge pin 128 is still positioned well above the horizontal line 62. After the load securing device has spanned the gap, if the hinge pin 128 is too high above the horizontal line 62, it cannot be pushed downward any further because further expansion of the load securing device is stopped by the wall and the cargo. If the hinge pin 128 cannot be pushed to or below the horizontal line 62, the locking mechanism 120 cannot be moved into the locked position. So, the rachet pin 126 may need to be repositioned with respect to the teeth of the first rack 70 and the second rack 80 so that the locking mechanism 120 may be moved into the locked position.

For example, assume that the load securing device shown in FIG. 2 has been extended so that the first brace 28 contacts the wall 12 and the second brace 60 contacts the cargo 16. Because the load securing device is already pressing against the wall 12 and the cargo 16, the hinge pin 128 cannot be pressed down any closer to the horizontal line 62, so the locking mechanism 120 cannot be moved from the adjustment position, as shown in FIG. 2, to the locked position. In FIG. 2, the rachet pin 126 is placed against the teeth of the first rack 70 and the second rack 80 that are the furthest away from the first brace 28. In order for the locking mechanism 120 to be able to be moved from the adjustment position to the locking position, the rachet pin 126 will need to be positioned against teeth that are closer to the first brace 28 so that the rachet portion 122 and the anchor portion 124 are closer to a horizontal position. For example, in FIG. 5, the locking mechanism 120 has been adjusted to reposition the rachet pin 126 against teeth that are closer to the first brace 28. The repositioning has oriented the rachet portion 122 and the anchor portion 124 so that they are more in line with the horizontal line 62, so the hinge pin 128 may be pressed down to a position at or slightly below the horizontal line 62. The position of the hinge pin 128 with respect to the horizontal line 62 while the locking mechanism 120 is in the locked position is best shown in FIG. 8.

As the hinge pin 128 is pressed down to a position slightly below the horizontal line 62, the locking mechanism 120 moves into the locked position. The pushing force between the rachet pin 126 and the pins 108 and 118 hold the hinge pin 128 slightly below the horizontal line 62 thereby maintaining the locking mechanism 120 and the locked position. To remove the load securing device from between the wall 12 and the cargo 16, the hinge pin 128 needs to be moved from slightly below the horizontal line 62 to above the horizontal line 62. Moving the hinge pin 128 from below the horizontal line 62 to above the horizontal line 62 moves the locking mechanism 120 from the locked position to the adjustment position. While in the locked position, the pushing force along the locking mechanism 120 between the rachet pin 126 and the pins 108 and 118 may be significant, so significant force may be required to move the hinge pin 128 from slightly below the horizontal line 62 to a position above the horizontal line 62. A tool, such as a bar or a hook for a fifth wheel, may be used to pull upward on the hinge pin 128 to move the locking mechanism 120 from the locked position to the adjustment position.

Unless otherwise defined, all technical and scientific terms used herein have the same meaning as commonly understood by one of ordinary skill in the art to which this invention belongs. Although methods and materials similar to or equivalent to those described herein can be used in the practice or testing of the various embodiments of the present disclosure, suitable methods and materials are described above. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls. The various embodiments of the present disclosure may be embodied in other specific forms without departing from the spirit or essential attributes thereof, and it is therefore desired that the various embodiments in the present disclosure be considered in all respects as illustrative and not restrictive. Any headings utilized within the description are for convenience only and have no legal or limiting effect.

What is claimed is:

1. A load securing device, comprising:
   a first support having a first outer member, a second outer member and a first brace; wherein the first brace is connected between the first outer member and the second outer member;
   a second support having a third outer member, a fourth outer member and a second brace, wherein the second brace is connected between the third outer member and the fourth outer member;
   wherein the first support is slidably connected to the second support;
   a first rack connected to the first support; and
   a locking mechanism pivotally connected to the third outer member and the fourth outer member and movable between an adjustment position and a locked position;
   wherein while in the adjustment position, the locking mechanism is operable to push against the first rack to move the first support away from the second support;
   wherein while in the locked position, the locking mechanism is operable to push against the first rack to fix a position of the first support with respect to the second support;
   wherein the first rack includes a plurality of teeth;
   wherein the locking mechanism further includes an anchor portion pivotally connected to the second support, a ratchet portion pivotally connected to the anchor portion by a hinge pin, and a rachet pin connected to the rachet portion, wherein the rachet pin is removably engageable with one of the plurality of teeth.

2. The load securing device of claim 1, further comprising a second rack, wherein the second rack is connected to the first support, wherein while the locking mechanism is in the adjustment position, the locking mechanism is operable to push against the first rack and the second rack to move the first support away from the second support, wherein while the locking mechanism is in the locked position, the locking mechanism is operable to push against the first rack and the second rack to fix a position of the first support with respect to the second support.

3. The load securing device of claim 2, wherein the second rack includes a plurality of teeth.

4. The load securing device of claim 1, wherein while the locking mechanism is in the locked position, the rachet pin applies a pushing force against one of the plurality of teeth, whereby the first rack, the first support, and the second support transfer the pushing force to a load to secure the load.

5. The load securing device of claim 1, wherein the first brace is connected to the first outer member at or near a first end of the first outer member, the first brace is connected to the second outer member at or near a first end of the second outer member, the second brace is connected to the third outer member at or near a first end of the third outer member, and the second brace is connected to the fourth outer member at or near a first end of the fourth outer member.

6. A load securing device, comprising:
   a first support having a first outer member, a second outer member and a first brace, wherein the first brace is connected between the first outer member and the second outer member;
   a second support having a third outer member, a fourth outer member and a second brace, wherein the second brace is connected between the third outer member and the fourth outer member;
   wherein the first support is slidably connected to the second support;
   a first rack having a plurality of teeth spaced apart along a length of the first rack, wherein the first rack is connected to the first support; and
   a locking mechanism having a rachet pin, wherein the locking mechanism is connected to the third outer member and the fourth outer member and moves between an adjustment position and a locked position;
   wherein while in the adjustment position, the locking mechanism is operable to push the rachet pin against one of the plurality of teeth to move the first support away from the second support thereby increasing a distance between the first brace and the second brace;
   wherein while in the locked position, the locking mechanism is operable to push the rachet pin against one of the plurality of teeth to fix the distance between the first support and the second support.

7. The load securing device of claim 6, further comprising a second rack, wherein the second rack is connected to the first support, wherein while the locking mechanism is in the adjustment position, the locking mechanism is operable to push against the first rack and the second rack to move the first support away from the second support, wherein while the locking mechanism is in the locked position, the locking mechanism is operable to push against the first rack and the second rack to fix a position of the first support with respect to the second support.

8. The load securing device of claim 7, wherein the second rack includes a plurality of teeth.

9. The load securing device of claim 6, wherein the locking mechanism further includes an anchor portion pivotally connected to the second support, and a ratchet portion pivotally connected to the anchor portion by a hinge pin, wherein the rachet pin is connected to the rachet portion.

10. The load securing device of claim 9, wherein while the locking mechanism is in the locked position, the rachet pin applies a pushing force against one of the plurality of teeth, whereby the first rack, the first support, and the second support transfer the pushing force to a load to secure the load.

11. The load securing device of claim 6, wherein the first brace is connected to the first outer member at or near a first end of the first outer member, the first brace is connected to the second outer member at or near a first end of the second outer member, the second brace is connected to the third outer member at or near a first end of the third outer member, and the second brace is connected to the fourth outer member at or near a first end of the fourth outer member.

12. A load securing device, comprising:
   a first support having a first outer member and a second outer member;
   a second support having a third outer member and a fourth outer member;
   wherein the first support is slidably connected to the second support;
   a first rack having a plurality of teeth, wherein the first rack is connected to the first support; and
   a locking mechanism having a rachet pin, wherein the locking mechanism is connected to the third outer member and the fourth outer member and moves between an adjustment position and a locked position;
   wherein while in the adjustment position, the locking mechanism is operable to push the rachet pin against one of the plurality of teeth to move the first support away from the second support thereby increasing a distance between the first support and the second support;
   wherein while in the locked position, the locking mechanism is operable to push the rachet pin against one of the plurality of teeth to fix the distance between the first support and the second support.

13. The load securing device of claim 12, further comprising a second rack, wherein the second rack is connected to the first support, wherein while the locking mechanism is in the adjustment position, the locking mechanism is operable to push against the first rack and the second rack to move the first support away from the second support, wherein while the locking mechanism is in the locked position, the locking mechanism is operable to push against the first rack and the second rack to fix a position of the first support with respect to the second support.

14. The load securing device of claim 13, wherein the second rack includes a plurality of teeth.

15. The load securing device of claim 12, wherein the locking mechanism further includes an anchor portion pivotally connected to the second support, and a ratchet portion pivotally connected to the anchor portion by a hinge pin, wherein the rachet pin is connected to the rachet portion.

16. The load securing device of claim 15, wherein while the locking mechanism is in the locked position, the rachet pin applies a pushing force against one of the plurality of teeth, whereby the first rack, the first support, and the second support transfer the pushing force to a load to secure the load.

17. The load securing device of claim 12, wherein the first outer member is slidably connected to the third outer member, and wherein the second outer member is slidably connected to the fourth outer member.

18. The load securing device of claim 12, wherein the locking mechanism is adjustably connected to the third outer member and the fourth outer member.

* * * * *